United States Patent
Murakami et al.

(10) Patent No.: US 11,967,728 B2
(45) Date of Patent: Apr. 23, 2024

(54) BATTERY PACK

(71) Applicant: MAKITA CORPORATION, Anjo (JP)

(72) Inventors: Junichi Murakami, Anjo (JP); Hideyuki Taga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 97 days.

(21) Appl. No.: 17/583,556

(22) Filed: Jan. 25, 2022

(65) Prior Publication Data

US 2022/0271378 A1 Aug. 25, 2022

(30) Foreign Application Priority Data

Feb. 22, 2021 (JP) ................................ 2021-026100

(51) Int. Cl.
*H01M 50/244* (2021.01)
*H01M 50/213* (2021.01)
*H01M 50/247* (2021.01)
*H01M 50/256* (2021.01)
*H01M 50/296* (2021.01)

(52) U.S. Cl.
CPC ....... *H01M 50/244* (2021.01); *H01M 50/213* (2021.01); *H01M 50/247* (2021.01); *H01M 50/256* (2021.01); *H01M 50/296* (2021.01)

(58) Field of Classification Search
None
See application file for complete search history.

(56) References Cited

U.S. PATENT DOCUMENTS

| 5,187,422 | A | * | 2/1993 | Izenbaard | H02J 7/0024 320/125 |
| D481,672 | S | * | 11/2003 | Niwa | D13/103 |
| D554,580 | S | * | 11/2007 | Ogasawara | D13/103 |
| D647,050 | S | * | 10/2011 | Tu | D13/103 |
| D762,165 | S | * | 7/2016 | Rowe | D13/103 |
| D821,967 | S | * | 7/2018 | Narendra | D13/103 |
| 2010/0221591 | A1 | * | 9/2010 | Ro kamp | H01M 50/247 429/99 |
| 2013/0216885 | A1 | * | 8/2013 | Kawatani | B60L 53/80 429/100 |

FOREIGN PATENT DOCUMENTS

| CN | 206506312 U | 9/2017 |
| CN | 108158491 A | 6/2018 |
| JP | 6124574 B2 | 5/2017 |

* cited by examiner

*Primary Examiner* — Gregg Cantelmo
(74) *Attorney, Agent, or Firm* — Oliff PLC

(57) ABSTRACT

A battery pack disclosed herein is configured to be attached to a battery pack mount by moving the same downward with respect to the battery pack mount and be detached from the battery pack mount by moving the same upward with respect to the battery pack mount. The battery pack comprises a casing. The casing includes a first guide groove and a second guide groove on a side surface of the casing in a left-right direction, with the first and second guide grooves each extending upward from a lower end of the side surface. A length of the first guide groove in an up-down direction and a length of the second guide groove in the up-down direction are different.

9 Claims, 25 Drawing Sheets

BATTERY PACK

CROSS-REFERENCE TO RELATED APPLICATION

This application claims priority to Japanese patent application No. 2021-026100, filed on Feb. 22, 2021, the entire contents of which are incorporated herein by reference.

TECHNICAL FIELD

The art disclosed herein relates to a battery pack.

BACKGROUND

Chinese Patent Application Publication No. 108158491 describes a battery pack configured to be attached to a battery pack mount by moving the battery pack downward with respect to the battery pack mount and to be detached from the battery pack mount by moving the battery pack upward with respect to the battery pack mount. The battery pack comprises a casing. The casing includes a first guide groove and a second guide groove on a side surface of the casing in a left-right direction, the first guide groove extending upward from a lower end of the side surface and the second guide groove extending upward from the lower end of the side surface. A length of the first guide groove in an up-down direction is the same as a length of the second guide groove in the up-down direction.

SUMMARY

In the aforementioned battery pack, if the battery pack mount includes two guide ribs corresponding to the first and second guide grooves, the battery pack can be suppressed from entering a state of being tilted in a front-rear direction upon attaching the battery pack to the battery pack mount. However, if the guide grooves are defined in the casing of the battery pack, an internal space of the casing is accordingly reduced, and constraints are placed on a component layout within the casing. The disclosure herein provides art to suppress a battery pack from entering a state of being tilted in a front-rear direction upon attaching the battery pack to a battery pack mount and further suppress an internal space of a casing from being reduced.

A battery pack disclosed herein may be configured to be attached to a battery pack mount by moving the battery pack downward with respect to the battery pack mount and to be detached from the battery pack mount by moving the battery pack upward with respect to the battery pack mount. The battery pack may comprise a casing. The casing may include a first guide groove and a second guide groove on a side surface of the casing in a left-right direction, the first guide groove extending upward from a lower end of the side surface and the second guide groove extending upward from the lower end of the side surface. A length of the first guide groove in an up-down direction and a length of the second guide groove in the up-down direction may be different.

In the battery pack as above, if the battery pack mount includes two guide ribs corresponding to the first and second guide grooves, the battery pack can be suppressed from entering a state of being tilted in a front-rear direction upon attaching the battery pack to the battery pack mount. Further, in the battery pack as above, since the length of one of the first and second guide grooves in the up-down direction is smaller than the length of the other of the first and second guide grooves in the up-down direction, an internal space of the casing is accordingly suppressed from being reduced.

DETAILED DESCRIPTION

Figure 1:
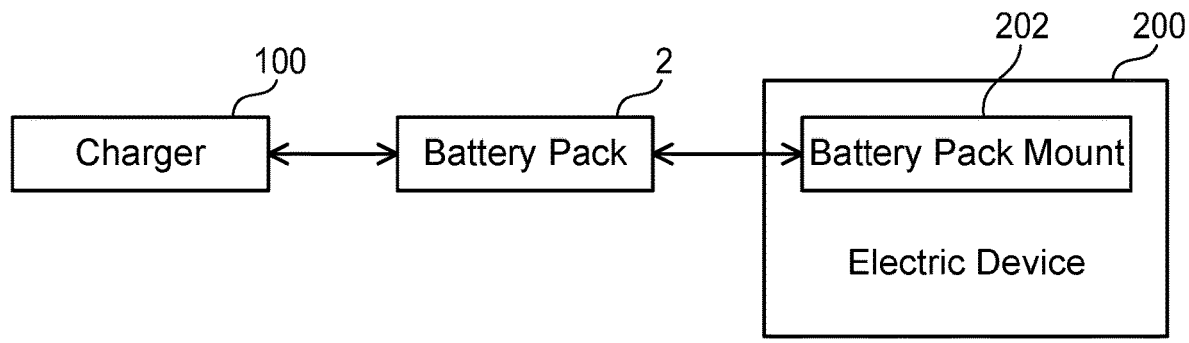
FIG. 1 schematically shows configurations of a battery pack 2, a charger 100, and an electric device 200 of an embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved battery packs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a battery pack may be configured to be attached to a battery pack mount by moving the battery pack downward with respect to the battery pack mount and to be detached from the battery pack mount by moving the battery pack upward with respect to the battery pack mount. The battery pack may comprise a casing. The casing may include a first guide groove and a second guide groove on a side surface of the casing in a left-right direction, the first guide groove extending upward from a lower end of the side surface and the second guide groove extending upward from the lower end of the side surface. A length of the first guide groove in an up-down direction and a length of the second guide groove in the up-down direction may be different.

In the battery pack as above, if the battery pack mount includes two guide ribs corresponding to the first and second guide grooves, the battery pack can be suppressed from entering a state of being tilted in a front-rear direction upon attaching the battery pack to the battery pack mount. Further, in the battery pack as above, since the length of one of the first and second guide grooves in the up-down direction is smaller than the length of the other of the first and second guide grooves in the up-down direction, an internal space of the casing can accordingly be suppressed from being reduced.

In one or more embodiments, the length of the second guide groove in the up-down direction may be smaller than half the length of the first guide groove in the up-down direction.

According to the above configuration, the length of the second guide groove in the up-down direction can significantly be reduced, and the internal space of the casing can accordingly be suppressed from being reduced.

In one or more embodiments, in the front-rear direction, the first guide groove may be arranged between one end, of the side surface and a center of the side surface. In the front-rear direction, the second guide groove may be arranged between another end of the side surface and the center of the side surface.

According to the above configuration, if the battery pack mount includes two guide ribs corresponding to the first and second guide grooves, the battery pack can be suppressed from entering the state of being tilted in the front-rear direction upon attaching the battery pack to the battery pack mount. Further, according to the above configuration, the internal space of the casing can be suppressed from being reduced in a center area of the casing in the front-rear direction.

In one or more embodiments, a width of the first guide groove in the front-rear direction and a width of the second guide groove in the front-rear direction may be different at the lower end of the side surface.

According to the above configuration, since the width of one of the first and second guide grooves in the front-rear direction is smaller than the width of the other of the first and second guide grooves in the front-rear direction, the internal space of the casing can accordingly be suppressed from being reduced.

In one or more embodiments, the width of the second guide groove in the front-rear direction may be smaller than half the width of the first guide groove in the front-rear direction at the lower end of the side surface.

According to the above configuration, the width of the second guide groove in the front-rear direction can significantly be reduced, and the internal space of the casing can accordingly be suppressed from being reduced.

In one or more embodiments, the length of the second guide groove in the up-down direction may be smaller than the length of the first guide groove in the up-down direction. At the lower end of the side surface, the width of the second guide groove in the front-rear direction may be smaller than the width of the first guide groove in the front-rear direction.

According to the above configuration, the internal space of the casing can be suppressed from being reduced in the vicinity of the second guide groove.

In one or more embodiments, the first guide groove may include: a lower guide portion extending upward from the lower end of the side surface; an upper guide portion arranged above the lower guide portion and extending along the up-down direction: and an intermediate guide portion connecting the lower guide portion and the upper guide portion to each other. A width of the upper guide portion in the front-rear direction may be smaller than a width of the lower guide portion in the front-rear direction.

According to the above configuration, when the battery pack mount includes a guide rib having a shape corresponding to the first guide groove, the battery pack can move slightly in the front-rear direction with respect to the battery pack mount in the state in which the distal end of the guide rib has entered into the lower guide portion, thus the battery pack can smoothly be moved in the up-down direction. Further, in the state in which the distal end of the guide rib has entered into the upper guide portion, movement of the battery pack in the front-rear direction with respect to the battery pack mount is restricted, thus the battery pack can firmly be fixed in the front-rear direction.

In one or more embodiments, a depth of the upper guide portion in the left-right direction may be smaller than a depth of the lower guide portion in the left-right direction.

According to the above configuration, when the battery pack mount includes the guide rib having the shape corresponding to the first guide groove, the battery pack can move slightly in the left-right direction with respect to the battery pack mount in the state in which the distal end of the guide rib has entered into the lower guide portion, thus the battery pack can smoothly be moved in the up-down direction. Further, in the state in which the distal end of the guide rib has entered into the upper guide portion, movement of the battery pack in the left-right direction with respect to the battery pack mount is restricted, thus the battery pack can firmly be fixed in the left-right direction.

In one or more embodiments, the first guide groove may include: a lower guide portion extending upward from the lower end of the side surface; an upper guide portion arranged above the lower guide portion and extending along the up-down direction; and an intermediate guide portion connecting the lower guide portion and the upper guide portion to each other. A depth of the upper guide portion in the left-right direction may be smaller than a depth of the lower guide portion in the left-right direction.

According to the above configuration, when the battery pack mount includes the guide rib having the shape corresponding to the first guide groove, the battery pack can move slightly in the left-right direction with respect to the battery pack mount in the state in which the distal end of the guide rib has entered into the lower guide portion, thus the battery pack can smoothly be moved in the up-down direction. Further, in the state in which the distal end of the guide rib has entered into the upper guide portion, the movement of the battery pack in the left-right direction with respect to the battery pack mount is restricted, thus the battery pack can firmly be fixed in the left-right direction.

In one or more embodiments, on one side in the front-rear direction, a side surface of the lower guide portion, a side surface of the upper guide portion, and a side surface of the intermediate guide portion may be arranged on a substantially same plane.

According to the above configuration, when the battery pack mount include the guide rib corresponding to the first guide groove and the battery pack mount is tilted with respect to a direction of gravity, the battery pack can smoothly be moved in the up-down direction as the side surface of the lower guide portion, the side surface of the upper guide portion, and the side surface of the intermediate guide portion that are arranged on the substantially same plane come into contact with and slide on a surface of the guide rib.

In one or more embodiments, the battery pack may comprise a grip extending in the left-right direction for a user to grip.

According to the above configuration, if the battery pack mount includes two guide ribs corresponding to the first and second guide grooves, the battery pack can be suppressed from entering the state of being tilted in the front-rear direction upon attaching the battery pack to the battery pack mount while the user is gripping the grip.

In one or more embodiments, a battery pack may comprise: a casing; a battery-side terminal accommodated in the casing; and a terminal cover configured to be attached to and detached from the casing. The casing may include a first casing surface and a first depressed surface depressed inward of the first casing surface. The first depressed surface may include a terminal opening through which a terminal to be connected to the battery-side terminal is to be inserted. The terminal cover may include a first cover part that covers the first depressed surface. When viewed along a first direction, which is along the first casing surface, with the terminal cover attached to the casing, an outer surface of the first cover part may be positioned inward of the first casing surface. When viewed along a second direction, which is along the first casing surface and perpendicular to the first direction, with the terminal cover attached to the casing, the outer surface of the first cover part may be positioned inward of the first casing surface.

In the battery pack as above, when viewed along the first direction with the terminal cover attached to the casing, the first cover part does not protrude outside beyond the casing, and also when viewed along the second direction, the first cover part does not protrude outside beyond the casing. Due to this, an outer shape of the battery pack is suppressed from increasing in size when the terminal cover is attached to the casing.

In one or more embodiments, the outer surface of the first cover part may include a first finger receiving portion for a user to place a finger upon detaching the terminal cover from the casing.

According to the above configuration, the user can more easily attach and detach the terminal cover.

In one or more embodiments, the first finger receiving portion may include a finger receiving protrusion protruding outward from the outer surface of the first cover part. When viewed along the first direction with the terminal cover attached to the casing, a distal end of the finger receiving protrusion may be positioned inward of the first casing surface. When viewed along the second direction with the terminal cover attached to the casing, the distal end of the finger receiving protrusion may be positioned inward of the first casing surface.

According to the above configuration, when viewed along the first direction with the terminal cover attached to the casing, the finger receiving protrusion does not protrude outside beyond the casing, and also when viewed along the second direction, the finger receiving protrusion does not protrude outside beyond the casing. Due to this, the outer shape of the battery pack is suppressed from increasing in size when the terminal cover is attached to the casing.

In one or more embodiments, the casing may include a second finger receiving portion for a user to place a finger upon detaching the terminal cover from the casing.

According to the above configuration, the user can more easily attach and detach the terminal cover.

In one or more embodiments, the terminal cover may be configured to be attached to the casing by being slid in the first direction, and be detached from the casing by being slid in a direction opposite to the first direction.

According to the above configuration, the user can attach and detach the terminal cover to and from the casing by sliding the terminal cover. The user can attach and detach the terminal cover without performing a complicated operation.

In one or more embodiments, the casing may further include: a second casing surface inclined with respect to the first casing surface; and a second depressed surface depressed inward of the second casing surface. The terminal cover may further include a second cover part that covers the second depressed surface. When viewed along a third direction, which is along the second casing surface, with the terminal cover attached to the casing, an outer surface of the second cover part may be positioned inward of the second casing surface. When viewed along a fourth direction, which is along the second casing surface and perpendicular to the third direction, with the terminal cover attached to the casing, the outer surface of the second cover part may be positioned inward of the second casing surface.

According to the above configuration, when viewed along the third direction with the terminal cover attached to the casing, the second cover part does not protrude outside beyond the casing, and also when viewed along the fourth direction, the second cover part does not protrude outside beyond the casing. Due to this, the outer shape of the battery pack is suppressed from increasing in size when the terminal cover is attached to the casing.

In one or more embodiments, the casing may include a casing-side engaging part. The terminal cover may include a cover-side engaging part configured to engage with the casing-side engaging part.

According to the above configuration, the terminal cover can be fixed with the terminal cover attached to the casing, thus the terminal cover can be suppressed from unintentionally detaching from the casing.

In one or more embodiments, the cover-side engaging part may be arranged between two slits.

According to the above configuration, the cover-side engaging part can be facilitated to elastically deform. When the user is to attach or detach the terminal cover, engagement of the cover-side engaging part and the casing-side engaging part and release of the engagement can more easily be performed.

In one or more embodiments, when the terminal cover is attached to the casing, movement of the terminal cover with respect to the casing in at least two directions that intersect each other may be restricted.

According to the above configuration, the terminal cover can be suppressed from wobbling with respect to the casing when the terminal cover is attached to the casing.

In one or more embodiments, a battery pack may be configured to be attached to a battery pack mount having a hook by moving the battery pack downward with respect to the battery pack mount and to be detached from the battery pack mount by moving the battery pack upward with respect to the battery pack mount. The battery pack may comprise a casing. The casing may include: a hook engaging groove with which the hook is to be engaged, the hook engaging groove being defined in a front surface of the casing; a hook sliding portion arranged on the front surface of the casing below the hook engaging groove, the hook sliding portion including a hook sliding surface on which the hook slides; and a hook passing portion arranged on the front surface of the casing below the hook sliding portion and which the hook passes. Over an entirety of the hook sliding portion in an up-down direction, a width of the hook sliding surface in a left-right direction may be smaller than a width of the hook in the left-right direction. A depth of the hook engaging groove in a front-rear direction may be greater than a depth of the hook sliding surface in the front-rear direction. A depth of the hook passing portion in the front-rear direction may be greater than the depth of the hook sliding surface in the front-rear direction.

According to the above configuration, when the battery pack is moved in the up-down direction with respect to the battery pack mount, the hook of the battery pack mount firstly passes the hook passing portion, then passes the hook sliding portion, and engages with the hook engaging groove. At this occasion, since the depth of the hook passing portion in the front-rear direction is greater than the depth of the hook sliding surface in the front-rear direction, sliding resistance that the battery pack receives from the hook upon when the hook passes the hook passing portion can be reduced. Further, according to the above configuration, the width of the hook sliding surface in the left-right direction is smaller than the width of the hook in the left-right direction over the entirety of the hook sliding portion in the up-down direction, thus an area by which the hook contacts the hook sliding surface can be reduced, and sliding resistance that the battery pack receives from the hook upon when the hook passes the hook sliding portion can be reduced. Moreover, according to the above configuration, since the hook engages with the hook engaging groove instead of a hook engaging protrusion, sliding resistance that the battery pack receives from the hook upon when the hook engages can be reduced.

In one or more embodiments, a depth of the hook passing portion in the front-rear direction may be greater than a depth of the hook engaging groove in the front-rear direction.

According to the above configuration, the sliding resistance that the battery pack receives from the hook of the battery pack mount upon when the hook passes the hook passing portion can further be reduced.

In one or more embodiments, over an entirety of the hook sliding portion in the up-down direction, the hook sliding surface may be depressed rearward of the front surface.

According to the above configuration, the sliding resistance that the battery pack receives from the hook upon when the hook of the battery pack mount passes the hook sliding portion can further be reduced.

In one or more embodiments, the hook sliding surface may include a right sliding surface and a left sliding surface separated apart from the right sliding surface. The hook sliding portion may further include a center surface arranged between the right and left sliding surfaces and depressed rearward of each of the right and left sliding surfaces.

According to the above configuration, upon when the hook of the battery pack mount passes the hook sliding portion, the hook comes into contact with both the right and left sliding surfaces. Thus, the hook can be suppressed from tilting in the left-right direction.

In one or more embodiments, the hook sliding surface may extend along the up-down direction.

If the hook sliding surface is inclined from its lower side toward its upper side such that it is inclined rearward from a front side, sliding resistance that the battery pack receives from the hook can be reduced, however, an internal space of the casing is reduced. On the other hand, if the hook sliding surface is inclined from its lower side toward its upper side such that it is inclined frontward from a rear side, a large internal space of the casing can be secured, however, the sliding resistance that the battery pack receives from the hook increases. According to the above configuration, since the hook sliding surface extends along the up-down direction, the sliding resistance that the battery pack receives from the hook can be reduced while a large internal space of the casing is secured.

In one or more embodiments, in the up-down direction, the hook engaging groove may be arranged in a center area of the front surface.

According to the above configuration, as compared to a case in which the hook engaging groove is arranged close to the upper end of the front surface, an area in which the hook slides against the casing can be reduced.

Embodiment

As shown in FIG. 1, a battery pack 2 of an embodiment is configured to be attached to and detached from a battery pack mount 101 of a charger 100. The charger 100 is configured to charge the battery pack 2 attached to the battery pack mount 101. Further, the battery pack 2 is configured to be attached to and detached from a battery pack mount 202 of an electric device 200. The electric device 200 may for example be a power tool which uses a motor as its prime mover, such as a driver and a drill, or may be an electric working machine which uses a motor as its prime mover, such as a mower and a blower. Alternatively, the electric device 200 may be an electric device which does not have a motor, such as a light, a radio, and a speaker. The electric device 200 is configured to operate using power supplied from the battery pack 2 attached to the battery pack mount 202.

Figure 2:
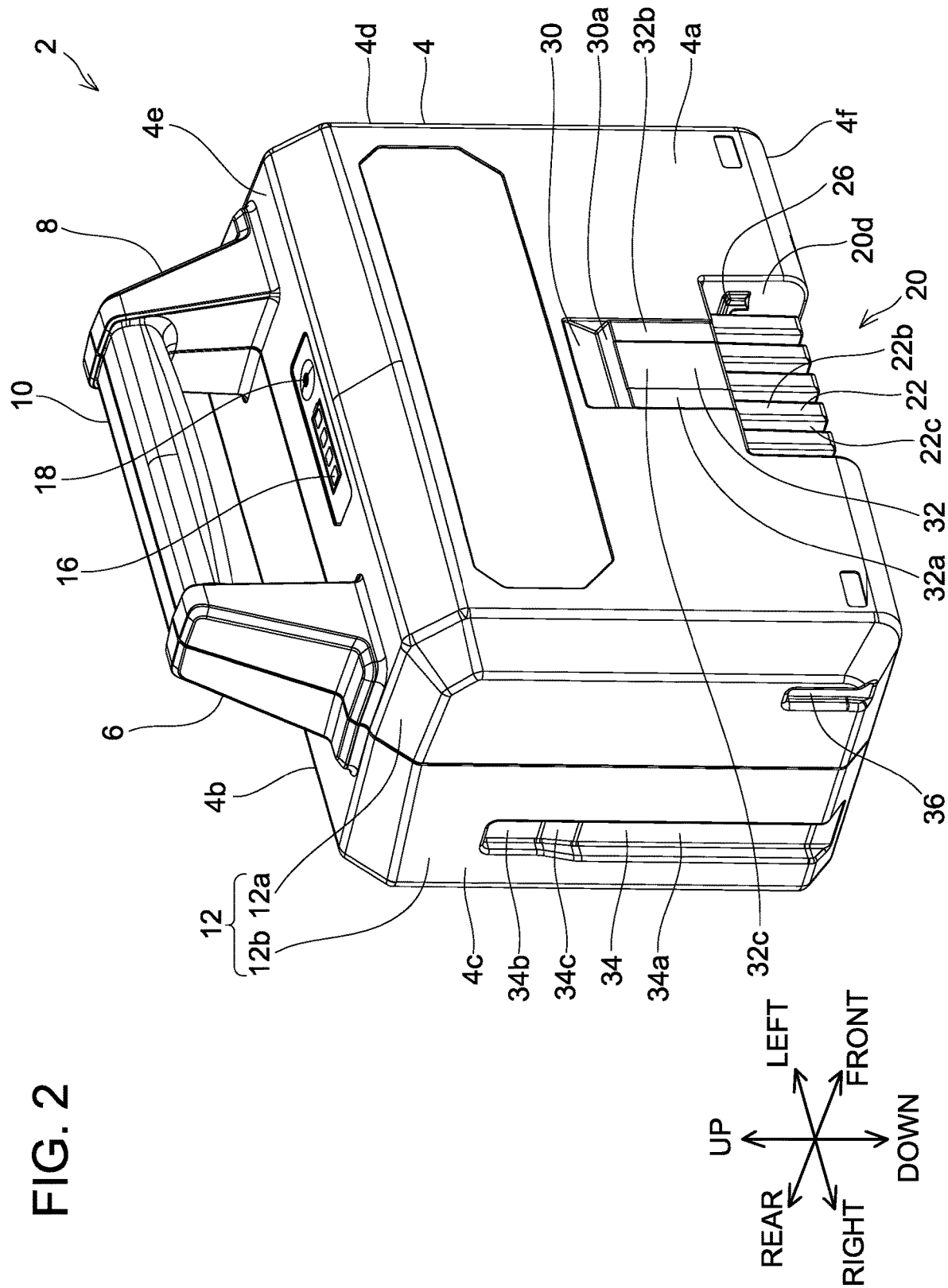
FIG. 2 is a perspective view of the battery pack 2 of the embodiment as viewed from the front right upper side.

As shown in FIG. 2, the battery pack 2 includes a body 4, a right support 6, a left support 8, and a grip 10. The body 4 has a substantially rectangular box shape. The body 4 includes a front surface 4a, a rear surface 4b, a right surface 4c, a left surface 4d, an upper surface 4e, and a bottom surface 4f. A dimension of the body 4 in an up-down direction is greater than a dimension of the body 4 in a front-rear direction. A dimension of the body 4 in a left-right direction is greater than the dimension of the body 4 in the up-down direction. The dimension of the body 4 in the up-down direction may for example be within a range of 150.0 mm to 250.0 mm, and may more specifically be 171.5 mm. The dimension of the body 4 in the front-rear direction may for example be within a range of 70.0 mm to 120.0 mm, and may more specifically be 90.0 mm. The dimension of the body 4 in the left-right direction may for example be within a range of 170.0 mm to 210.0 mm, and may more specifically be 190.0 mm. The right support 6 protrudes upward from a vicinity of the right end of the upper surface 4e of the body 4. The left support 8 protrudes upward from a vicinity of the left end of the upper surface 4e of the body 4. The grip 10 extends in the left-right direction and connects the upper end of a left surface of the right support 6 and the upper end of a right surface of the left support 8. Weight of the battery pack 2 may for example be within a range of 1.0 kg to 4.0 kg, and may more specifically be 2.2 kg. A rated voltage of the battery pack 2 may for example be within a range of 36 V to 108 V. and may more specifically be 57.6 V. A rated capacity of the battery pack 2 may for example be within a range of 3.0 Ah to 12.0 Ah, and may more specifically be 4.0 Ah.

Figure 12:
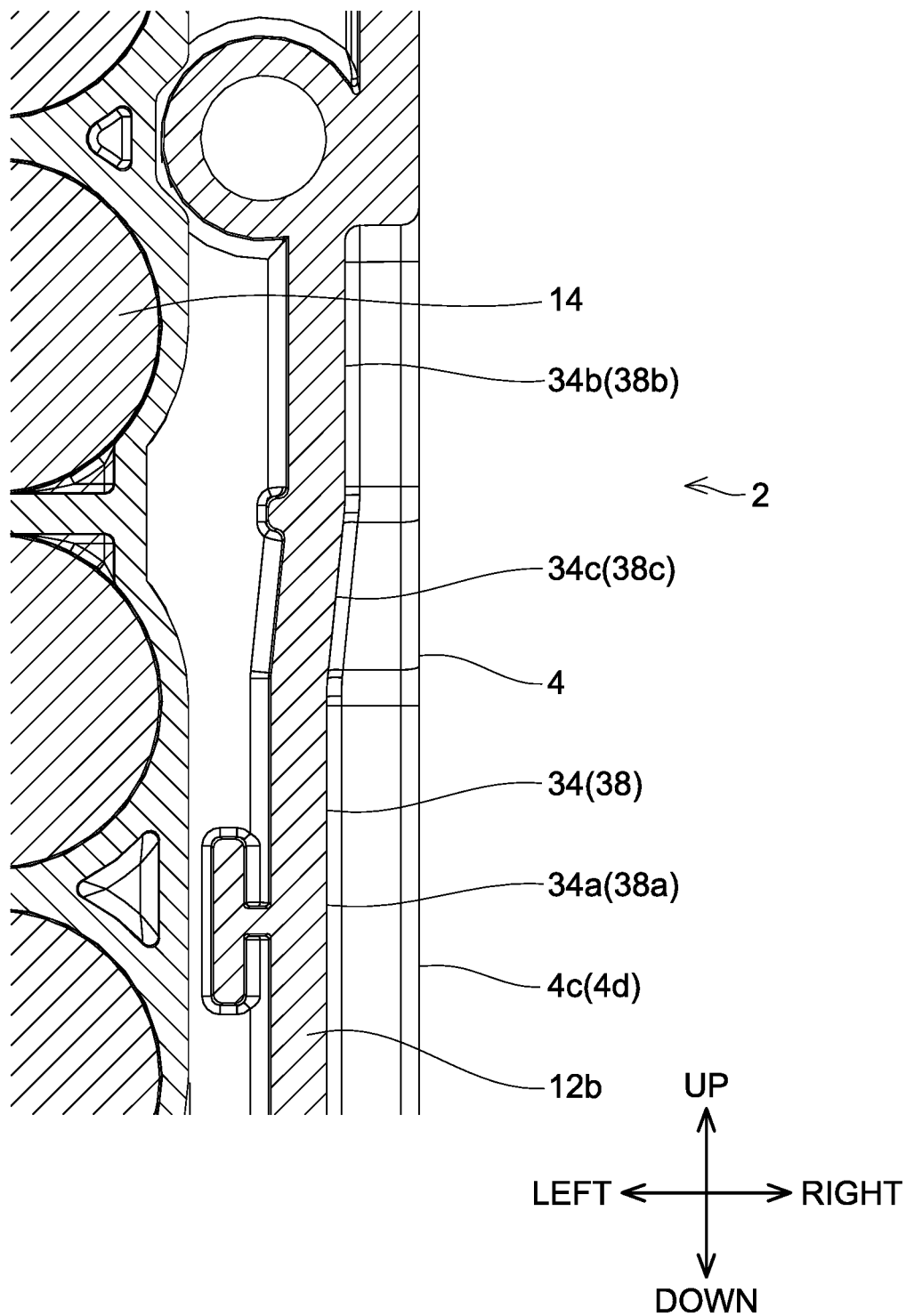
FIG. 12 is a vertical cross-sectional view of a first right guide groove 34 of the battery pack 2 of the embodiment and its vicinity.

The battery pack 2 includes a casing 12 and a plurality of battery cells 14 accommodated in the casing 12 (see FIG. 12). The casing 12 includes a front casing 12a and a rear casing 12b. The front casing 12a defines outer shapes of front halves of the body 4, the right support 6, the left support 8, and the grip 10. The rear casing 12b defines outer shapes of rear halves of the body 4, the right support 6, the left support 8, and the grip 10.

A remaining charge indicator 16 and a remaining charge display button 18 are arranged near the front end of the upper surface 4e of the body 4. The remaining charge indicator 16 displays a battery charge level of the battery pack 2. The remaining charge display button 18 is a button for a user to perform an on-operation for displaying the battery charge level on the remaining charge indicator 16. The remaining charge indicator 16 turns on when the on-operation is performed on the remaining charge display button 18, and automatically turns off when a predetermined time elapses. In the front-rear direction, the remaining charge indicator 16 and the remaining charge display button 18 are arranged frontward of the grip 10. In the left-right direction, the remaining charge indicator 16 and the remaining charge display button 18 are arranged leftward of the right support 6 and rightward of the left support 8.

Figure 3:
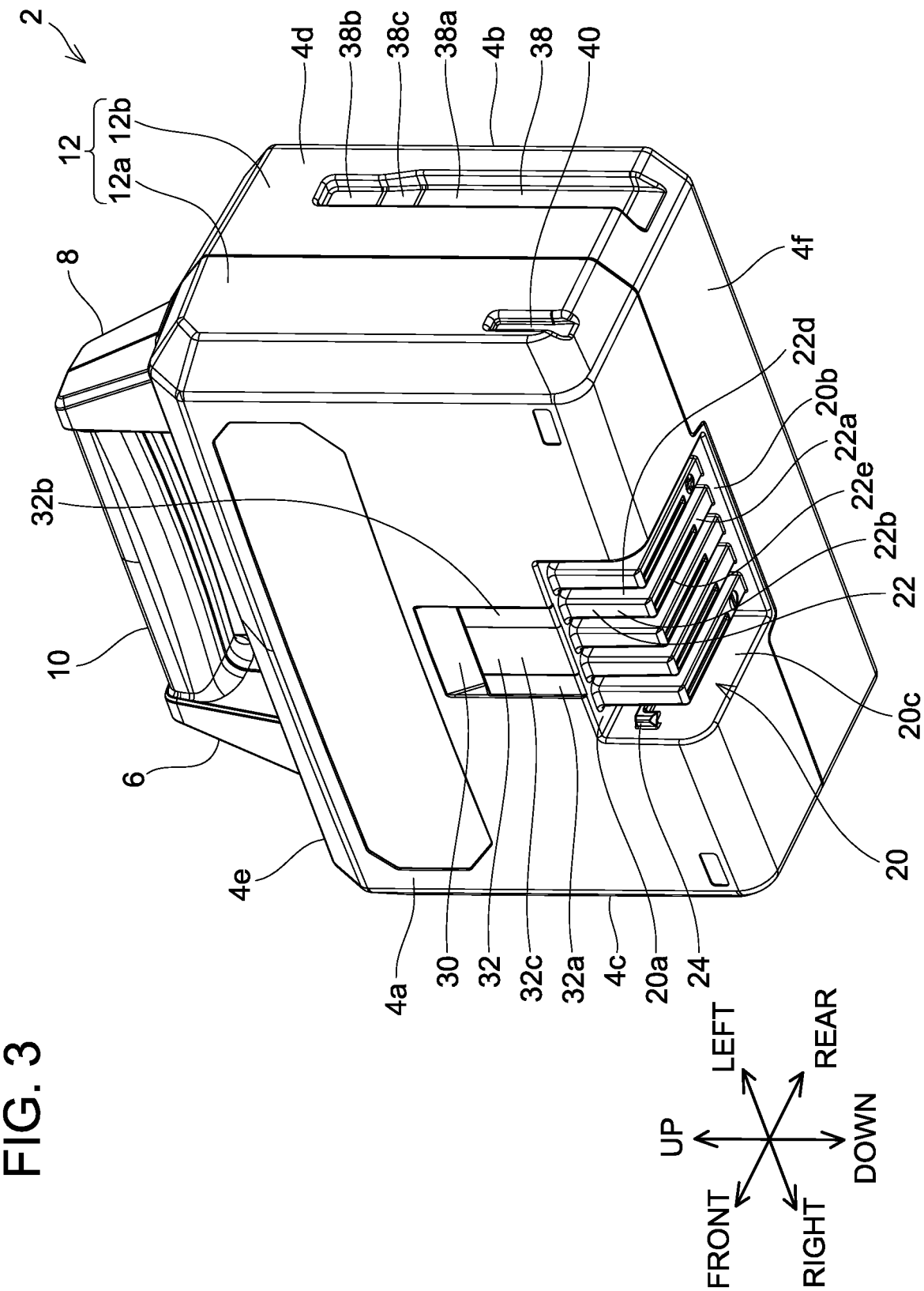
FIG. 3 is a perspective view of the battery pack 2 of the embodiment as viewed from the front left lower side.

A terminal interface (hereinbelow denoted also as I/F) 20 is arranged at a front lower portion of the body 4 in a center area in the left-right direction. As shown in FIG. 3, the terminal I/F 20 includes an I/F upper surface 20a, an I/F rear surface 20b, an I/F right surface 20c, and an I/F left surface 20d (see FIG. 2). The I/F upper surface 20a extends along the front-rear direction and the left-right direction, faces downward, and is arranged such that it is offset upward from the bottom surface 4f of the body 4. The I/F rear surface 20b extends along the up-down direction and the left-right direction, faces frontward, and is arranged such that it is offset rearward from the front surface 4a of the body 4. The I/F right surface 20c extends along the front-rear direction and the up-down direction, and is arranged facing leftward. The I/F left surface 20d (see FIG. 2) extends along the front-rear direction and the up-down direction, and is arranged facing rightward. Further, the terminal I/F 20 includes a plurality of terminal receptacles 22 arranged adjacent to each other in the left-right direction and arranged between the I/F right surface 20c and the I/F left surface 20d. Each of the terminal receptacles 22 includes a bottom surface 22a extending along the front-rear direction and the left-right direction, a front surface 22b extending along the left-right direction and the up-down direction, a right surface 22c (see FIG. 2) extending along the front-rear direction and the up-down direction, and a left surface 22d extending along the front-rear direction and the up-down direction. The bottom surface 22a of each of the terminal receptacles 22 has its front end connected to the lower end of the front surface 22b, and its rear end connected to the I/F rear surface 20b. The front surface 22b of each of the terminal receptacles 22 has its upper end connected to the I/F upper surface 20a. The right surface 22c and the left surface 22d of each of the terminal receptacles 22 each have its front end connected to the front surface 22h, its rear end connected to the I/F rear surface 20b, its upper end connected to the I/F upper surface 20a, and its lower end connected to the bottom surface 22a. The bottom surfaces 22a of the respective terminal receptacles 22 are positioned higher than the bottom surface 4f of the body 4 and arranged on the substantially same plane. The front surfaces 22b of the respective terminal receptacles 22 are arranged rearward of the front surface 4a of the body 4 and on the substantially same plane.

A terminal opening 22e is defined in the bottom surface 22a of each of the terminal receptacles 22. The terminal openings 22e are slit-shaped through holes having their longitudinal directions along the front-rear direction. A battery-side terminal (not shown) is accommodated in each of the terminal receptacles 22.

Figure 4:
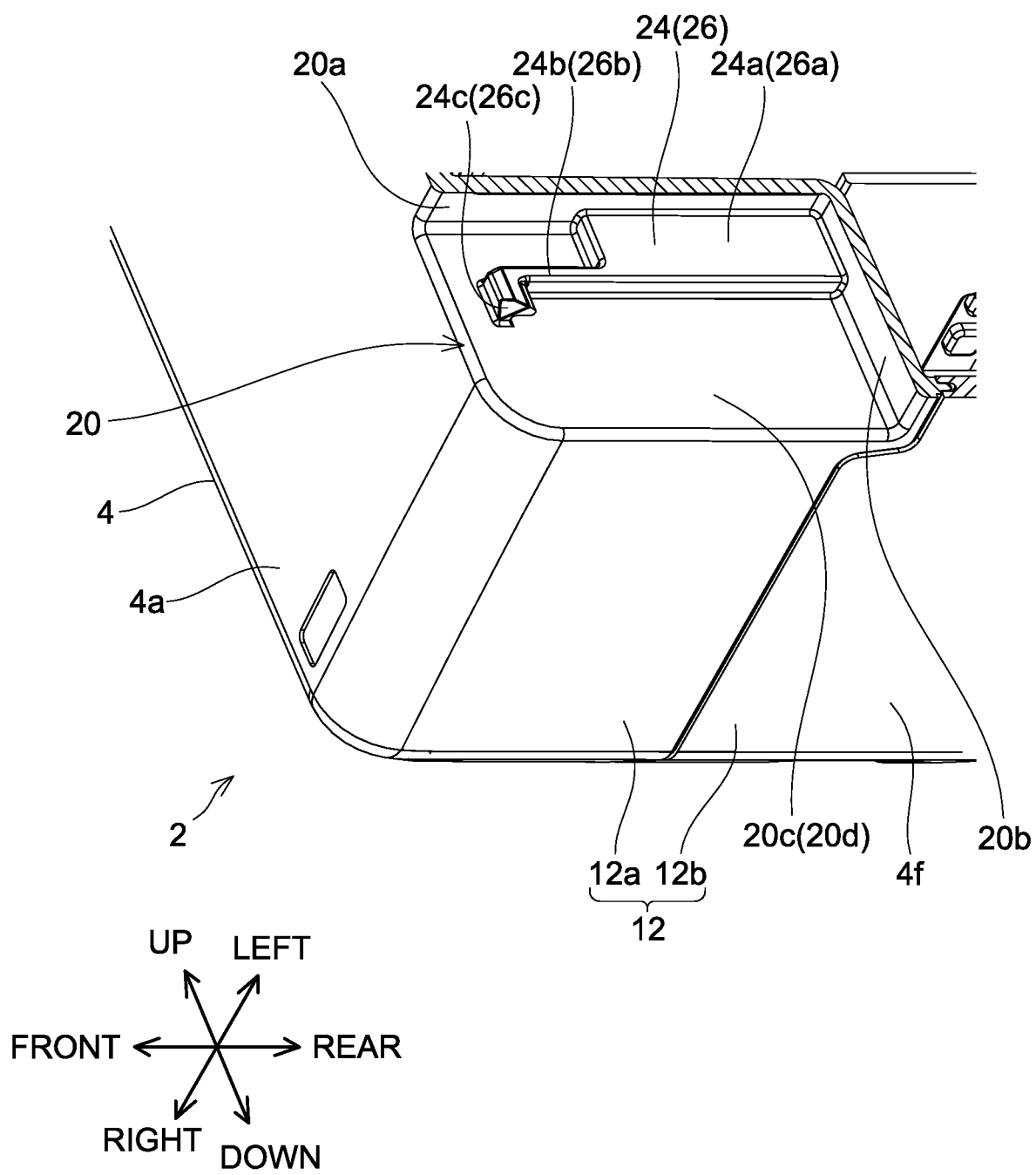
FIG. 4 is a perspective cross-sectional view of a right engaging part 24 of the battery pack 2 of the embodiment and its vicinity as viewed from the front left lower side.

As shown in FIG. 3, a right engaging part 24 protruding leftward is arranged on the I/F right surface 20c of the terminal I/F 20. As shown in FIG. 2, a left engaging part 26 protruding rightward is arranged on the I/F left surface 20d of the terminal I/F 20. The right engaging part 24 and the left engaging part 26 are at positions and have shapes that are left-right symmetric to each other. As shown in FIG. 4, the right engaging part 24 includes a base 24a having its upper end connected to the I/F upper surface 20a and its rear end connected to the I/F rear surface 20h, a rail 24b extending frontward from the lower front end of the base 24a, and the distal end 24c extending downward from the front end of the rail 24b. Similarly, the left engaging part 26 includes a base 26a having its upper end connected to the I/F upper surface 20a and its rear end connected to the I/F rear surface 20b, a rail 26b extending frontward from the lower front end of the base 26a, and the distal end 26c extending downward from the front end of the rail 26h.

Figure 5:
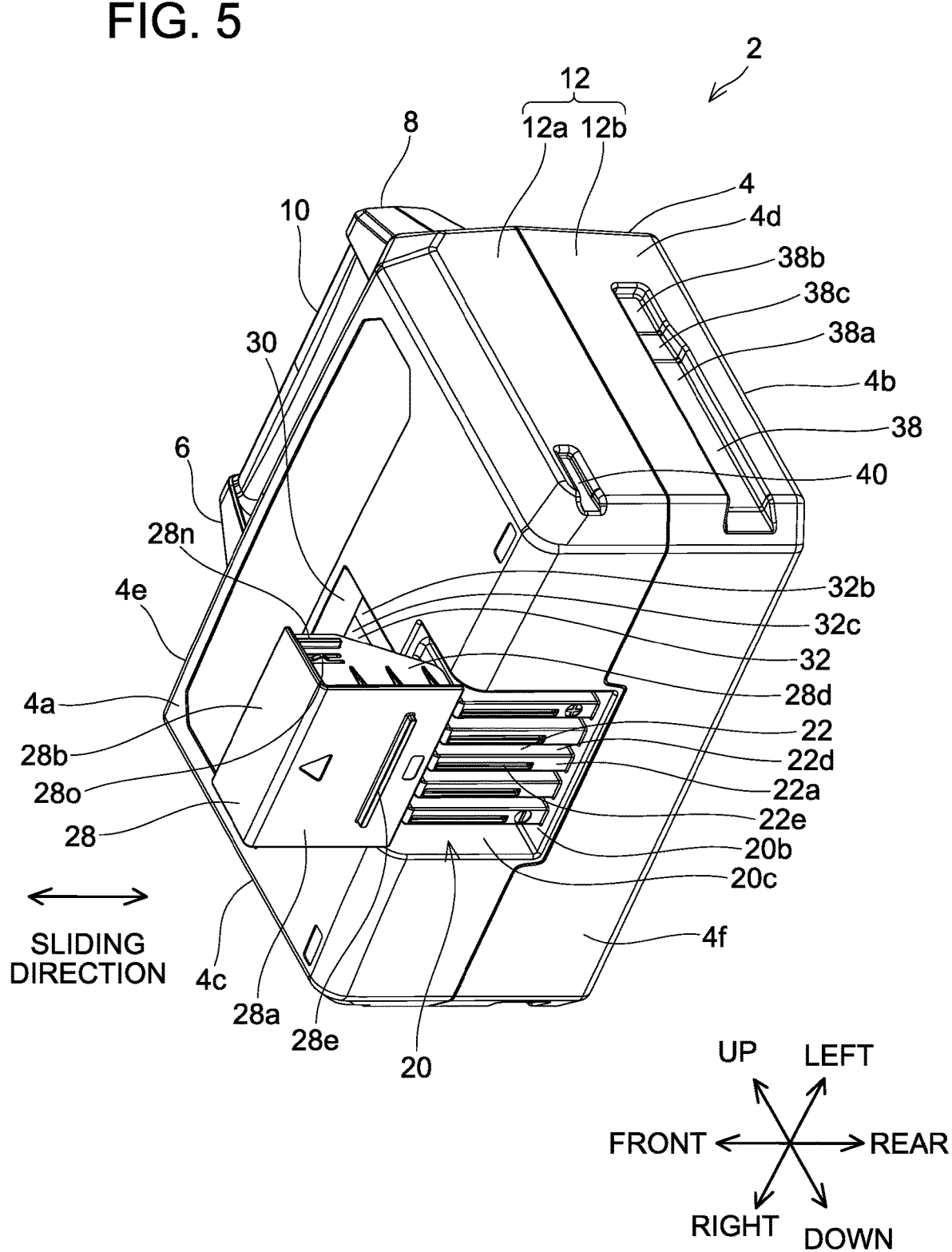
FIG. 5 is a perspective view of how a terminal cover 28 is attached to and detached from the battery pack 2 of the embodiment as viewed from the front left lower side.

As shown in FIG. 5, a terminal cover 28 is configured to be attached to and detached from the terminal I/F 20. The terminal cover 28 can be attached to the terminal I/F 20 by sliding it rearward with respect to the terminal I/F 20. Further, the terminal cover 28 can be detached from the terminal I/F 20 by sliding it frontward with respect to the terminal I/F 20. That is, the terminal cover 28 can be attached to and detached from the terminal I/F 20 by sliding it with respect to the terminal I/F 20 with the front-rear direction as its sliding direction.

Figure 6:
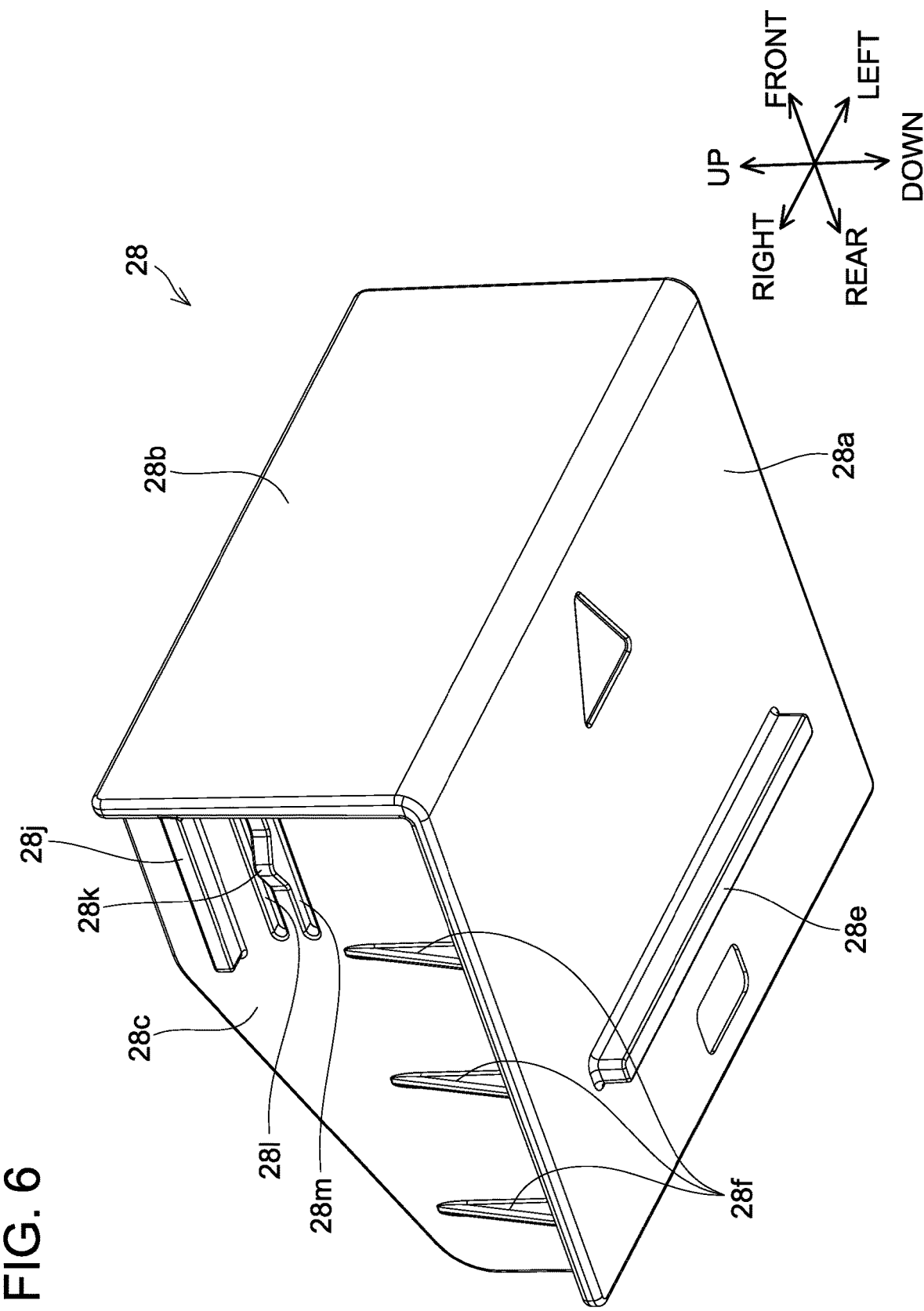
FIG. 6 is a perspective view of the terminal cover 28 of the battery pack 2 of the embodiment as viewed from the front right lower side.
Figure 7:
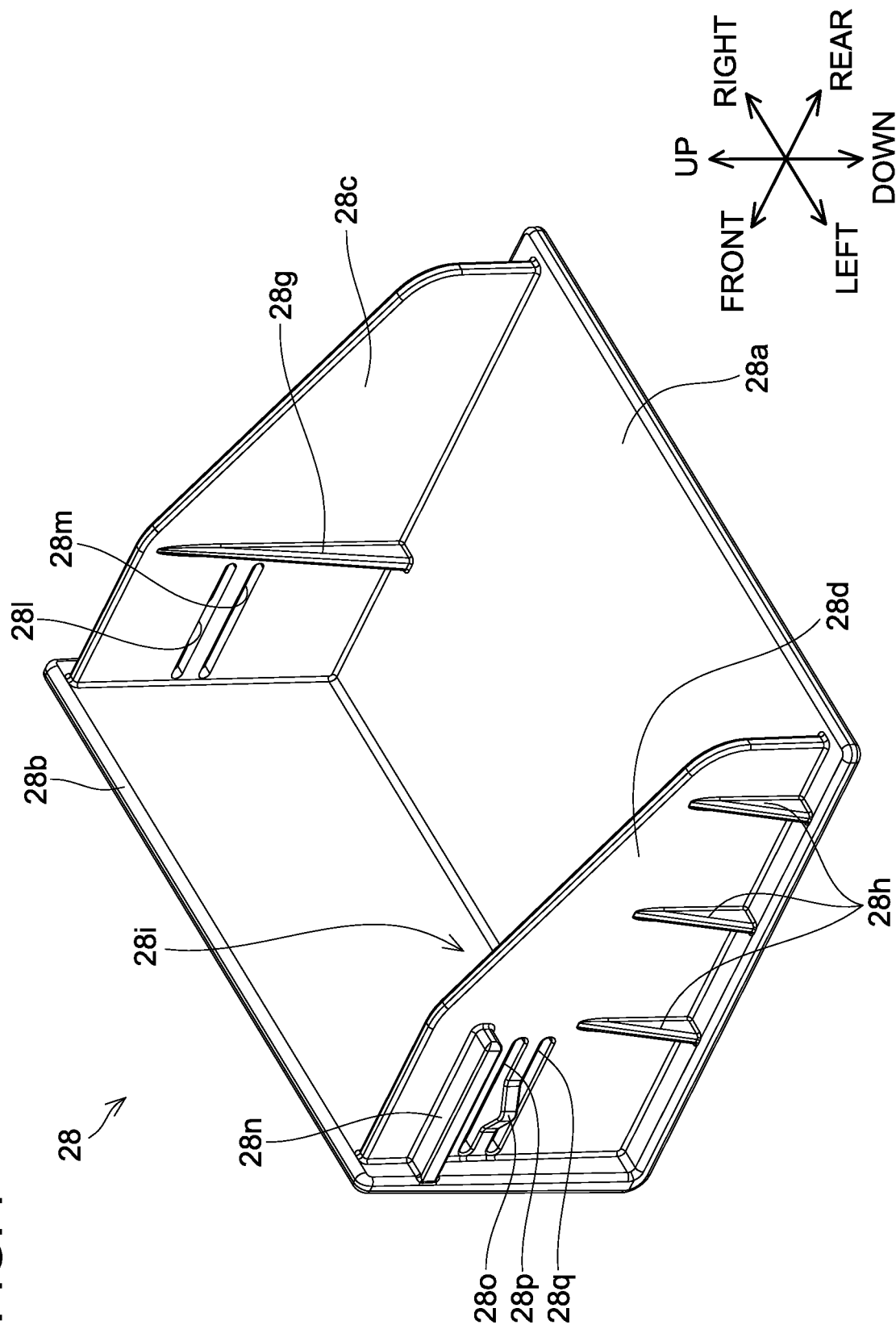
FIG. 7 is a perspective view of the terminal cover 28 of the battery pack 2 of the embodiment as viewed from the rear left upper side.

As shown in FIG. 6, the terminal cover 28 includes a lower plate 28a, a front plate 28b, a right plate 28c, and a left plate 28d (see FIG. 7). The terminal cover 28 is a member composed for example of resin, and the lower plate 28a, the front plate 28b, the right plate 28c, and the left plate 28d are integrated. The lower plate 28a has a substantially flat plate shape along the front-rear direction and the left-right direction. The lower plate 28a has a substantially rectangular shape with its longitudinal direction along the left-right direction and its short direction along the front-rear direction. A finger receiving protrusion 28e protruding downward and extending in the left-right direction is arranged on a bottom surface of the lower plate 28a. The finger receiving protrusion 28e is arranged rearward of the center of the lower plate 28a with respect to the front-rear direction. The front plate 28b extends upward from the front end of the lower plate 28a. The front plate 28h has a flat plate shape along the up-down direction and the left-right direction. The front plate 28b has a substantially rectangular shape with its longitudinal direction along the left-right direction and its short direction along the up-down direction.

As shown in FIG. 7, the right plate 28c and the left plate 28d have a flat plate shape along the front-rear direction and the up-down direction. The right plate 28c and the left plate 28d each have a shape of a rectangle which has a longitudinal direction along the front-rear direction and a short direction along the up-down direction with its rear upper portion obliquely cut off. The right plate 28c is arranged leftward of the right ends of the front plate 28h and the lower plate 28a. The front end of the right plate 28c is connected to the vicinity of the right end of a rear surface of the front plate 28b. The lower end of the right plate 28c is connected to the vicinity of the right end of an upper surface of the lower plate 28a. As shown in FIG. 6, outer reinforcement ribs 28f protruding rightward are arranged on a right surface of the right plate 28c. As shown in FIG. 7, an inner reinforcement rib 28g protruding leftward is arranged on a left surface of the right plate 28c. The outer reinforcement ribs 28f and the inner reinforcement rib 28g extend in the up-down direction. The lower ends of the outer reinforcement ribs 28f and the lower end of the inner reinforcement rib 28g are connected to the upper surface of the lower plate 28a. The left plate 28d is arranged rightward of the left ends of the front plate 28h and the lower plate 28a. The front end of the left plate 28d is connected to the vicinity of the left end of the rear surface of the front plate 28h. The lower end of the left plate 28d is connected to the vicinity of the left end of the upper surface of the lower plate 28a. Outer reinforcement ribs 28h protruding leftward are arranged on a left surface of the left plate 28d. An inner reinforcement rib 28i protruding rightward is arranged on a right surface of the left plate 28d. The outer reinforcement ribs 28h and the inner reinforcement rib 28i extend in the up-down direction. The lower ends of the outer reinforcement ribs 28h and the lower end of the inner reinforcement rib 28i are connected to the upper surface of the lower plate 28a.

As shown in FIG. 6, a right rail 28j protruding rightward and a right engaging protrusion 28k protruding rightward are further arranged on the right surface of the right plate 28c. The right rail 28j extends in the front-rear direction. The right plate 28c has an upper slit 28l extending in the front-rear direction above the right engaging protrusion 28k and a lower slit 28m extending in the front-rear direction below the right engaging protrusion 28k defined therein. By having the upper slit 28l and the lower slit 28m defined in the right plate 28c, the right engaging protrusion 28k is allowed to easily deform elastically in the left-right direction. Similarly, as shown in FIG. 7, a left rail 28n protruding leftward and a left engaging protrusion 28o protruding leftward are further arranged on the left surface of the left plate 28d. The left rail 28n extends in the front-rear direction. The left plate 28d has an upper slit 28p extending in the front-rear direction above the left engaging protrusion 28o and a lower slit 28q extending in the front-rear direction below the left engaging protrusion 28o defined therein. By having the upper slit 28p and the lower slit 28q defined in the left plate 28d, the left engaging protrusion 28o is allowed to easily deform elastically in the left-right direction.

Figure 8:
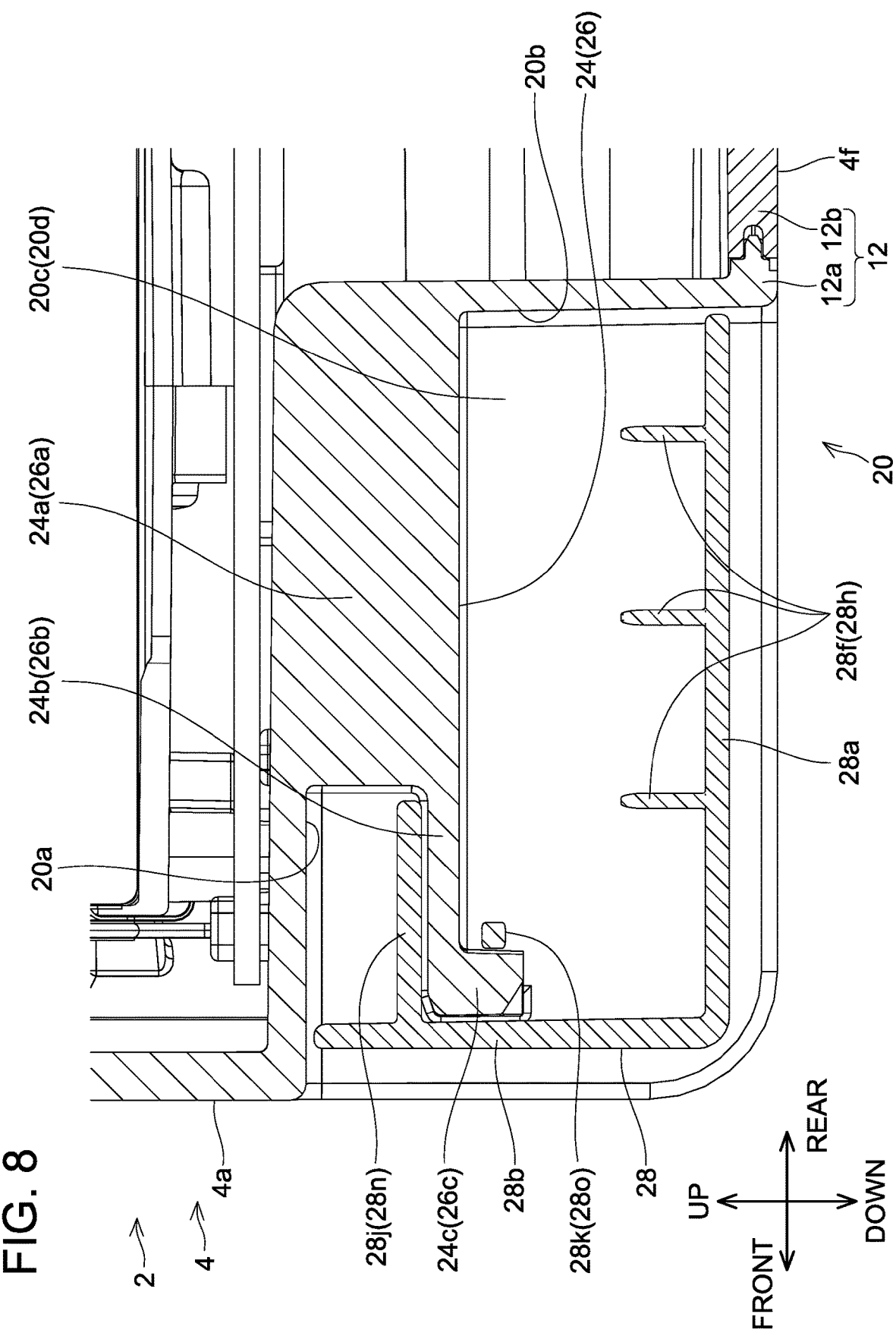
FIG. 8 is a vertical cross-sectional view of the right engaging part 24 and its vicinity with the terminal cover 28 attached to the battery pack 2 of the embodiment.

As shown in FIG. 8, when the terminal cover 28 is to be attached to the terminal I/F 20, a bottom surface of the right rail 28j of the terminal cover 28 slides with respect to an upper surface of the rail 24h of the right engaging part 24, and a bottom surface of the left rail 28n of the terminal cover 28 slides with respect to an upper surface of the rail 26b of the left engaging part 26. Then, the terminal cover 28 is fixed with respect to the terminal I/F 20 when the right engaging protrusion 28k of the terminal cover 28 engages with the distal end 24c of the right engaging part 24 and the left engaging protrusion 28o of the terminal cover 28 engages with the distal end 26c of the left engaging part 26.

With the terminal cover 28 attached to the terminal I/F 20, the bottom surface of the right rail 28j faces the upper surface of the rail 24h of the right engaging part 24, and the bottom surface of the left rail 28n faces the upper surface of the rail 26h of the left engaging part 26, by which downward movement of the terminal cover 28 with respect to the terminal I/F 20 is restricted. Further, with the terminal cover 28 attached to the terminal I/F 20, the upper surface of the lower plate 28a of the terminal cover 28 faces the bottom surfaces 22a of the terminal receptacles 22 (see FIG. 5), by which upward movement of the terminal cover 28 with respect to the terminal I/F 20 is restricted.

With the terminal cover 28 attached to the terminal I/F 20, the right surface of the right plate 28c (see FIG. 6) faces the left surface of the base 24a of the right engaging part 24, by which rightward movement of the terminal cover 28 with respect to the terminal I/F 20 is restricted. Further, with the terminal cover 28 attached to the terminal I/F 20, the left surface of the left plate 28d (see FIG. 7) faces the right surface of the base 26a of the left engaging part 26, by which leftward movement of the terminal cover 28 with respect to the terminal I/F 20 is restricted.

With the terminal cover 28 is attached to the terminal I/F 20, the rear surface of the front plate 28h faces the front surfaces 22h of the terminal receptacles 22 (see FIG. 3), by which rearward movement of the terminal cover 28 with respect to the terminal I/F 20 is restricted. Further, with the terminal cover 28 attached to the terminal I/F 20, the right engaging protrusion 28k of the terminal cover 28 engages with the distal end 24c of the right engaging part 24, and the left engaging protrusion 28o of the terminal cover 28 engages with the distal end 26c of the left engaging part 26, by which frontward movement of the terminal cover 28 with respect to the terminal I/F 20 is restricted.

Figure 9:
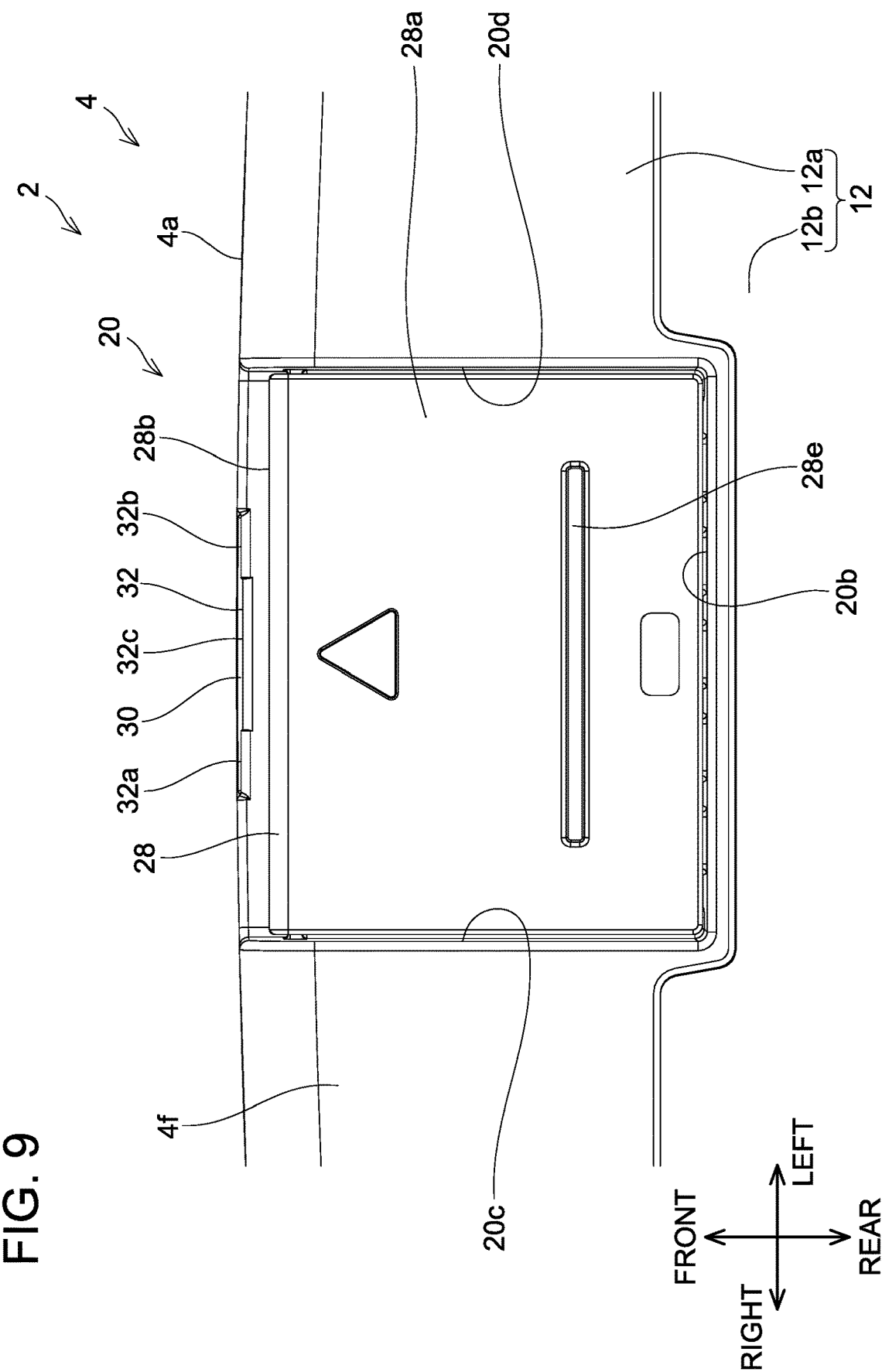
FIG. 9 is a bottom view of a terminal I/F 20 and its vicinity with the terminal cover 28 attached to the battery pack 2 of the embodiment as viewed from below.
Figure 10:
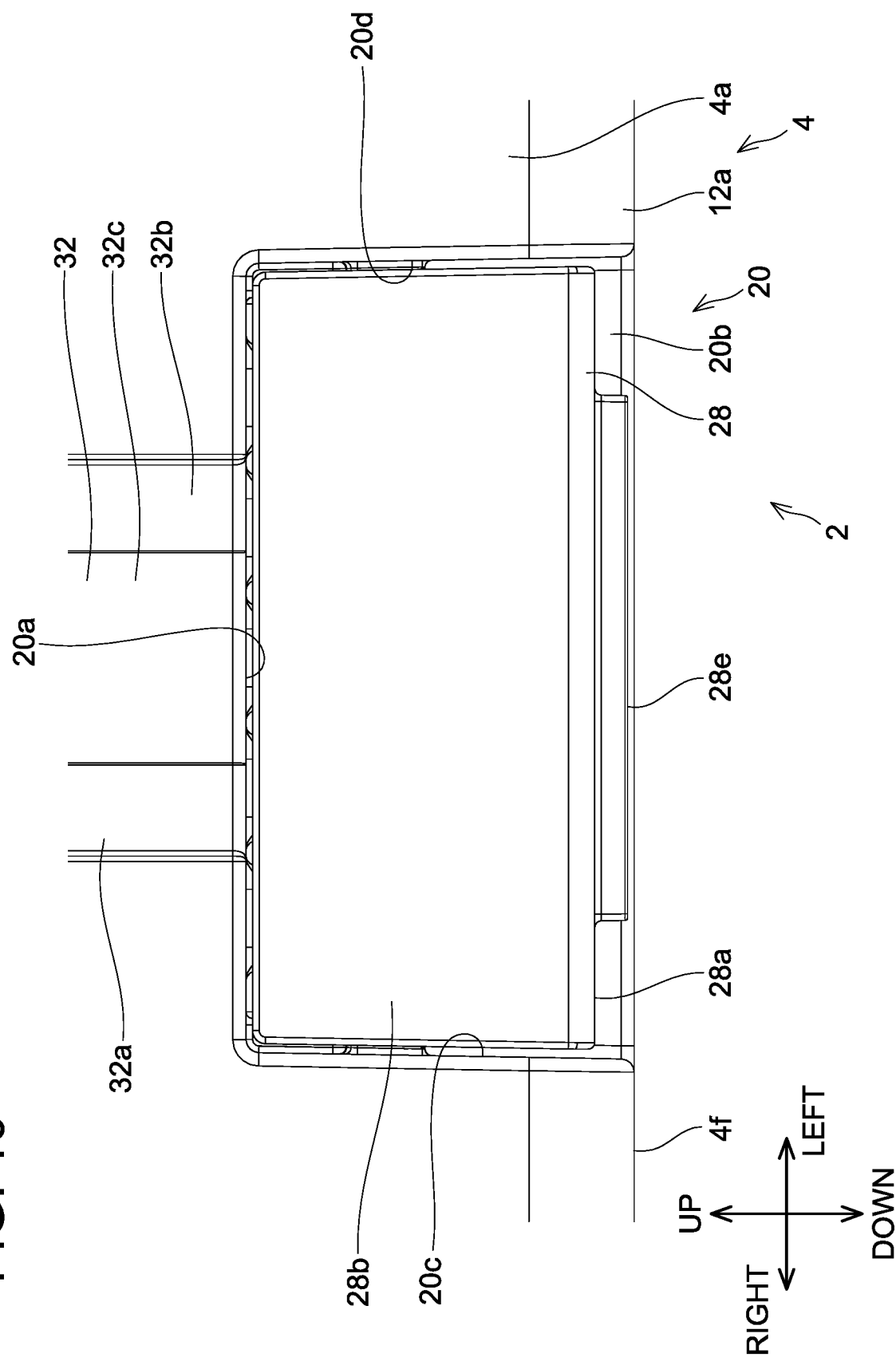
FIG. 10 is a front view of the terminal I/F 20 and its vicinity with the terminal cover 28 attached to the battery pack 2 of the embodiment as viewed from the front side.

As shown in FIG. 9, with the terminal cover 28 attached to the terminal I/F 20, the bottom surfaces 22a of the respective terminal receptacles 22 as well as the terminal openings 22e of the respective terminal receptacles 22 are covered by the lower plate 28a of the terminal cover 28. As shown in FIG. 10, with the terminal cover 28 attached to the terminal I/F 20, front surfaces 22b of the respective terminal receptacles 22 are covered by the front plate 28b of the terminal cover 28.

With the terminal cover 28 attached to the terminal I/F 20, the bottom surface of the lower plate 28a of the terminal cover 28 is arranged above the bottom surface 4f of the body 4, and the lower end of the finger receiving protrusion 28e is also arranged above the bottom surface 4f of the body 4. That is, when the terminal I/F 20 is viewed from the right or left side with the terminal cover 28 attached to the terminal I/F 20, the bottom surface of the lower plate 28a and the lower end of the finger receiving protrusion 28e of the terminal cover 28 are positioned inward of the bottom surface 4f of the body 4, and when the terminal I/F 20 is viewed from the front or rear side, the bottom surface of the lower plate 28a and the lower end of the finger receiving protrusion 28e of the terminal cover 28 are positioned inward of the bottom surface 4f of the body 4. Due to this, the battery pack 2 can be suppressed from increasing in size in the up-down direction when the terminal cover 28 is attached to the terminal I/F 20. Further, as shown in FIG. 9, with the terminal cover 28 attached to the terminal I/F 20, a front surface of the front plate 28b of the terminal cover 28 is arranged rearward of the front surface 4a of the body 4. That is, when the terminal I/F 20 is viewed from the right or left side with the terminal cover 28 attached to the terminal I/F 20, the front surface of the front plate 28h of the terminal cover 28 is positioned inward of the front surface 4a of the body 4, and when the terminal I/F 20 is viewed from the upper or lower side, the front surface of the front plate 28b of the terminal cover 28 is positioned inward of the front surface 4a of the body 4. Due to this, the battery pack 2 can be suppressed from increasing in size in the front-rear direction when the terminal cover 28 is attached to the terminal I/F 20.

As shown in FIG. 5, when the terminal cover 28 is to be detached from the terminal I/F 20, the user places his/her linger on the finger receiving protrusion 28e and slides the terminal cover 28 frontward with respect to the terminal I/F 20. By doing so, engagement of the right engaging protrusion 28k of the terminal cover 28 (see FIG. 8) with the distal end 24c of the right engaging part 24 and engagement of the left engaging protrusion 28o of the terminal cover 28 (see FIG. 8) with the distal end 26c of the engaging part 26 are thereby released, by which the terminal cover 28 is detached from the terminal I/F 20. In detaching the terminal cover 28, the user may use a hook engaging groove 30 to be described later (see FIG. 3) as a finger receiving recess. That is, the user can slide the terminal cover 28 frontward with respect to the terminal I/F 20 with the thumb of one hand placed on the hook engaging groove 30 and the index, middle, ring, and/or pinky fingers of the same hand placed on the finger receiving protrusion 28e.

As shown in FIG. 2, the hook engaging groove 30 and a hook sliding groove 32 are defined in the front surface 4a of the body 4. The hook engaging groove 30 includes an engagement surface 30a that is inclined toward the rear side from its lower portion to its upper portion and facing forward and upward. The hook engaging groove 30 is arranged in a center area of the front surface 4a in the up-down direction, and is arranged in a center area of the front surface 4a in the left-right direction. A width of the hook engaging groove 30 in the left-right direction is smaller than a width of the terminal I/F 20 in the left-right direction. A depth in the front-rear direction from the front surface 4a of the body 4 to the hook engaging groove 30 is smaller than a depth in the front-rear direction from the front surface 4a of the body 4 to the front surfaces 22b of the terminal receptacles 22. That is, in the front-rear direction, the rear end of the hook engaging groove 30 is positioned forward of the front surfaces 22b of the terminal receptacles 22 of the terminal I/F 20.

The hook sliding groove 32 is arranged on the front surface 4a between the terminal I/F 20 and the hook engaging groove 30. The hook sliding groove 32 includes a right sliding surface 32a, a left sliding surface 32b, and a center surface 32c. The right sliding surface 32a and the left sliding surface 32b extend along the up-down direction and the left-right direction, and are arranged rearward of the front surface 4a of the body 4 and on the substantially same plane. The right sliding surface 32a extends in the up-down direction between the terminal I/F 20 and the hook engaging groove 30 at the right end of the hook engaging groove 30. The left sliding surface 32b extends in the up-down direction between the terminal I/F 20 and the hook engaging groove 30 at the left end of the hook engaging groove 30. The center surface 32c extends in the up-down direction and the left-right direction, and is arranged rearward of the right sliding surface 32a and the left sliding surface 32b. The center surface 32c extends in the up-down direction between the terminal I/F 20 and the hook engaging groove 30 at a position leftward of the right sliding surface 32a and rightward of the left sliding surface 32b.

A depth in the front-rear direction from the front surface 4a of the body 4 to the center surface 32c is smaller than the depth in the front-rear direction from the front surface 4a of the body 4 to the hook engaging groove 30. That is, in the front-rear direction, the center surface 32c is positioned forward of the rear end of the hook engaging groove 30. Further, a depth in the front-rear direction from the front surface 4a of the body 4 to the right sliding surface 32a and the left sliding surface 32b is smaller than the depth in the front-rear direction from the front surface 4a of the body 4 to the center surface 32c. That is, in the front-rear direction, the right sliding surface 32a and the left sliding surface 32b are positioned forward of the center surface 32c.

As shown in FIG. 2, the right surface 4c of the body 4 comprises a first right guide groove 34 extending in the up-down direction and a second right guide groove 36 extending in the up-down direction defined therein. The first right guide groove 34 is arranged close to the rear end of the right surface 4c and arranged between the center of the right surface 4c in the front-rear direction and the rear end of the right surface 4c. The second right guide groove 36 is arranged close to the front end of the right surface 4c and arranged between the center of the right surface 4c in the front-rear direction and the front end of the right surface 4c. As shown in FIG. 3, the left surface 4d of the body 4 comprises a first left guide groove 38 extending in the up-down direction and a second left guide groove 40 extending in the up-down direction defined therein. The first left guide groove 38 is arranged close to the rear end of the left surface 4d and arranged between the center of the left surface 4d in the front-rear direction and the rear end of the left surface 4d. The second left guide groove 40 is arranged close to the front end of the left surface 4d and arranged between the center of the left surface 4d in the front-rear direction and the front end of the left surface 4d. The first right guide groove 34 and the first left guide groove 38 are at positions and have shapes that are left-right symmetric to each other. The second right guide groove 36 and the second left guide groove 40 are at positions and have shapes that are left-right symmetric to each other.

Figure 11:
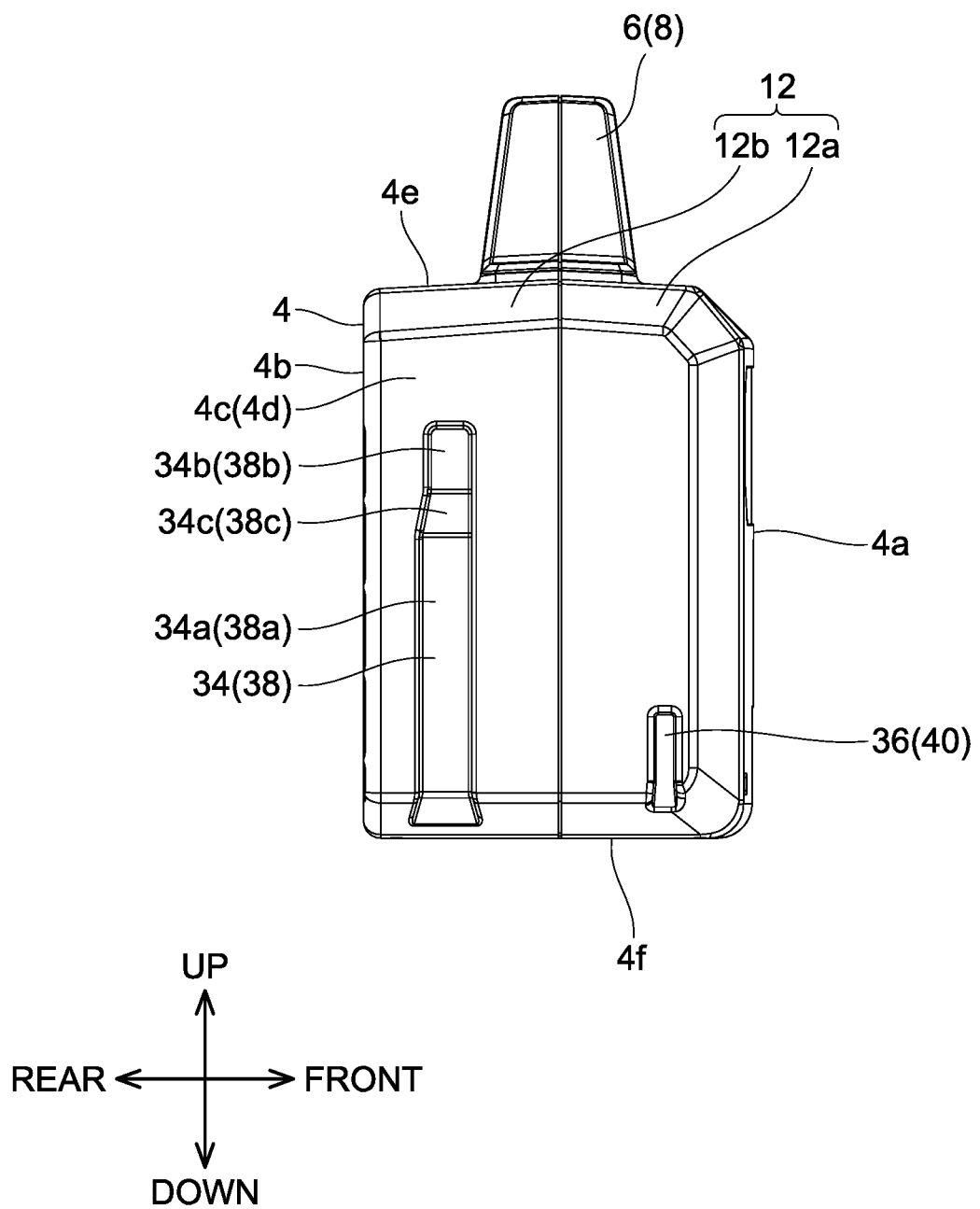
FIG. 11 is a side view of the battery pack 2 of the embodiment as viewed from the right side.

As shown in FIG. 11, the first right guide groove 34 includes a lower guide portion 34a, an upper guide portion 34b, and an intermediate guide portion 34c. The lower guide portion 34a is a groove having a substantially rectangular cross-sectional shape, and extends upward from the lower end of the right surface 4c. The lower guide portion 34a has a substantially constant width in the front-rear direction and a substantially constant depth in the left-right direction. The width of the lower guide portion 34a in the front-rear direction may for example be in a range of 8.0 mm to 15.0 min and specifically be 12.0 mm. The depth of the lower guide portion 34a in the left-right direction may for example be in a range of 3.0 mm to 8.0 mm and specifically be 5.0 mm. The upper guide portion 34h is a groove having a substantially rectangular cross-sectional shape, and extends in the up-down direction above the lower guide portion 34a. The upper guide portion 34b has a substantially constant width in the front-rear direction and a substantially constant depth in the left-right direction. The width of the upper guide portion 34b in the front-rear direction may for example be in a range of 5.0 mm to 12.0 mm and specifically be 10.0 mm. The depth of the upper guide portion 34h in the left-right direction may for example be in a range of 1.5 mm to 6.0 mm and specifically be 4.0 mm. The width of the upper guide portion 34b in the front-rear direction is smaller than the width of the lower guide portion 34a in the front-rear direction. Further, as shown in FIG. 12, the depth of the upper guide portion 34h in the left-right direction is smaller than the depth of the lower guide portion 34a in the left-right direction. The intermediate guide portion 34c is a groove having a substantially rectangular cross-sectional shape, and connects the upper end of the lower guide portion 34a and the lower end of the upper guide portion 34h. As shown in FIG. 11, the upper guide portion 34h and the intermediate guide portion 34c are positioned higher than the center of the right surface 4c in the up-down direction. A front side surface of the lower guide portion 34a, a front side surface of the intermediate guide portion 34c, and a front side surface of the upper guide portion 34h are arranged on the substantially same plane. A length of the first right guide groove 34 in the up-down direction may for example be in a range of 50.0 mm to 110.0 mm and specifically be 95.0 mm. The first left guide groove 38 has the same configuration as the first right guide groove 34. The first left guide groove 38 includes a lower guide portion 38a, an upper guide portion 38b, and an intermediate guide portion 38c.

The second right guide groove 36 is a groove having a substantially rectangular cross-sectional shape, and extends upward from the lower end of the right surface 4c. The second right guide groove 36 has a substantially constant width in the front-rear direction and a substantially constant depth in the left-right direction. The width of the second right guide groove 36 in the front-rear direction may for example be in a range of 1.5 mm to 10.0 mm and specifically be 5.0 mm. The depth of the second right guide groove 36 in the left-right direction may for example be in a range of 1.5 mm to 5.0 mm and specifically be 3.0 mm. A length of the second right guide groove 36 in the up-down direction may for example be in a range of 15.0 mm to 50.0 mm and specifically be 29.0 mm. The width of the second right guide groove 36 in the front-rear direction is smaller than the width of each of the lower guide portion 34a, the upper guide portion 34b, and the intermediate guide portion 34c of the first right guide groove 34 in the front-rear direction. Further, the depth of the second right guide groove 36 in the left-right direction is smaller than the depth of each of the lower guide portion 34a, the upper guide portion 34b, and the intermediate guide portion 34c of the first right guide groove 34 in the left-right direction. The upper end of the second right guide groove 36 is positioned lower than the center of the right surface 4c in the up-down direction. The second left guide groove 40 has the substantially same configuration as the second right guide groove 36.

Figure 13:
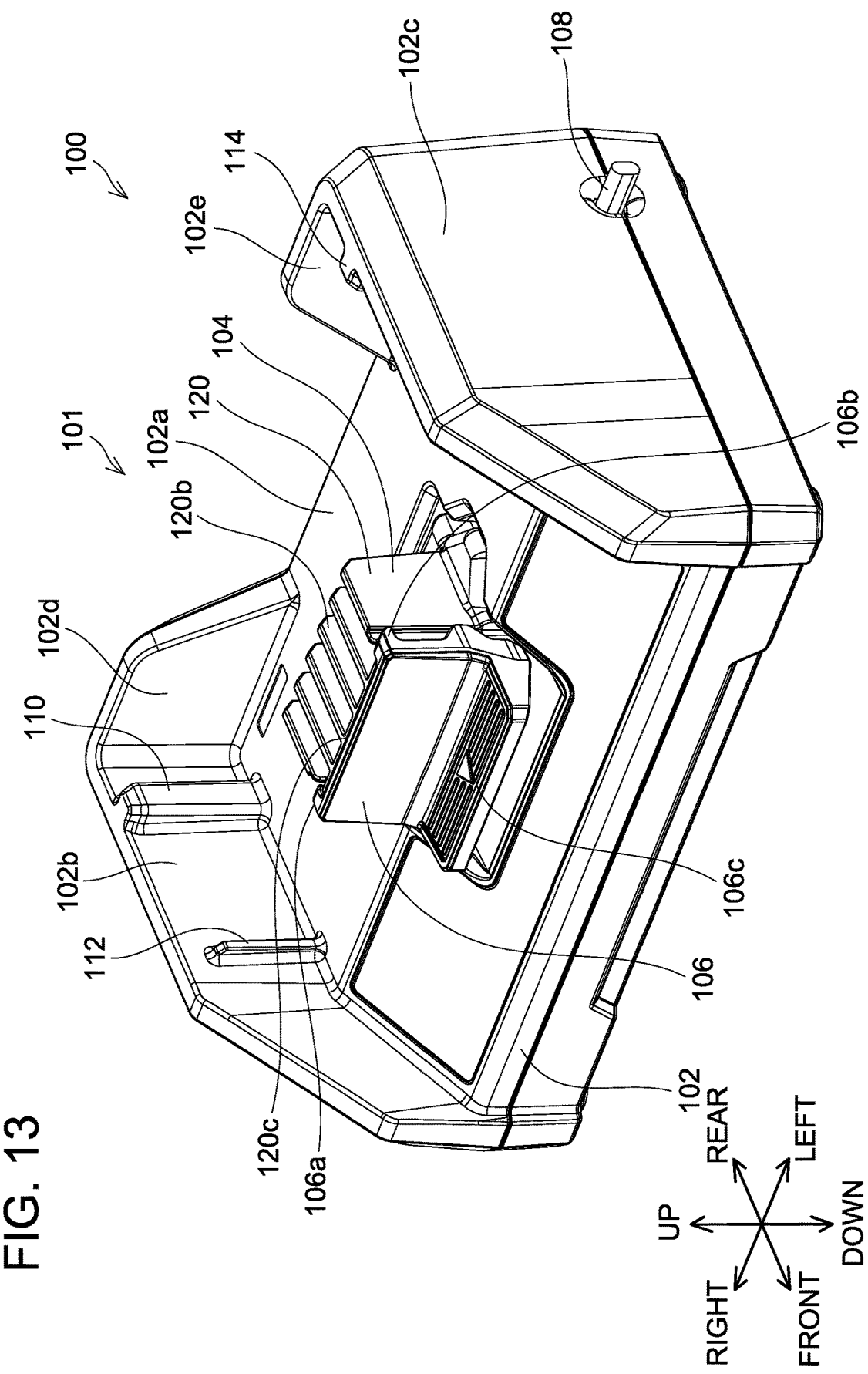
FIG. 13 is a perspective view of the charger 100 to and from which the battery pack 2 of the embodiment can be attached and detached, as viewed from the front left upper side.

(Attachment to Charger 100) As shown in FIG. 13, the charger 100 includes a housing 102, a terminal unit 104, a hook 106, and a power cable 108. The housing 102 includes a mounting portion 102a where the battery pack 2 is to be mounted, a right wall 102b arranged at the right end of the mounting portion 102a and extending in the front-rear direction and the up-down direction, a left wall 102c arranged at the left end of the mounting portion 102a and extending in the front-rear direction and the up-down direction, and a right rear wall 102d and a left rear wall 102e arranged at the rear end of the mounting portion 102a and extending in the left-right direction and the up-down direction. The right end of the right rear wall 102d is connected to the rear end of the right wall 102b. The left end of the left rear wall 102e is connected to the rear end of the left wall 102c. The mounting portion 102a, the right wall 102b, the left wall 102c, the right rear wall 102d, and the left rear wall 102e of the housing 102, the terminal unit 104, and the hook 106 constitute the battery pack mount 101 of the charger 100.

Figure 14:
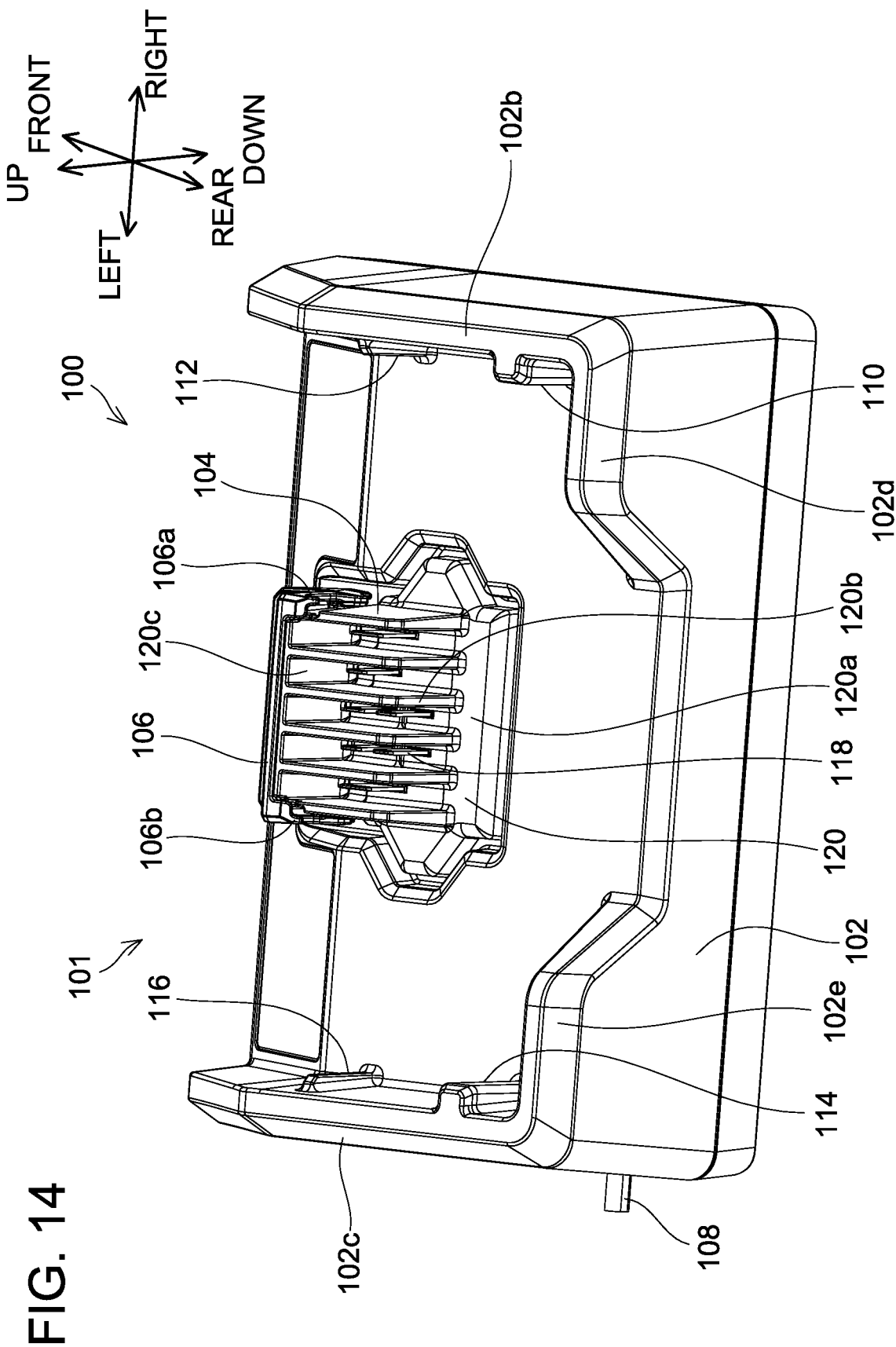
FIG. 14 is a perspective view of the charger 100 to and from which the battery pack 2 of the embodiment can be attached and detached, as viewed from the rear right upper side.

A first right guide rib 110 and a second right guide rib 112 are arranged on a left surface of the right wall 102b. The first right guide rib 110 and the second right guide rib 112 are arranged corresponding to the first right guide groove 34 and the second right guide groove 36 of the battery pack 2 (see FIG. 2). As shown in FIG. 14, a first left guide rib 114 and a second left guide rib 116 are arranged on a right surface of the left wall 102c. The first left guide rib 114 and the second left guide rib 116 are arranged corresponding to the first left guide groove 38 and the second left guide groove 40 of the battery pack 2 (see FIG. 3). The first right guide rib 110 and the first left guide rib 114 are at positions and have shapes that are left-right symmetric to each other. The second right guide rib 112 and the second left guide rib 116 are at positions and have shapes that are left-right symmetric to each other.

As shown in FIG. 13, the first right guide rib 110 and the second right guide rib 112 protrude leftward from the left surface of the right wall 102b. The first right guide rib 110 and the second right guide rib 112 each have a substantially rectangular cross-sectional shape. The first right guide rib 110 extends in the up-down direction from an upper surface of the mounting portion 102a to the upper end of the right wall 102b. A width of the first right guide rib 110 in the front-rear direction and a height thereof in the left-right direction are slightly smaller than the width of the lower guide portion 34a (see FIG. 2) of the first right guide groove 34 of the battery pack 2 in the front-rear direction and the depth thereof in the left-right direction, respectively. The second right guide rib 112 extends in the up-down direction from the upper surface of the mounting portion 102a. A width of the second right guide rib 112 in the front-rear direction, a height thereof in the left-right direction, and a length thereof in the up-down direction are slightly smaller than the width of the second right guide groove 36 of the battery pack 2 (see FIG. 2) in the front-rear direction, the depth thereof in the left-right direction, and the length thereof in the up-down direction, respectively. The first left guide rib 114 and the second left guide rib 116 (see FIG. 14) respectively have similar configurations as the first right guide rib 110 and the second right guide rib 112.

The terminal unit 104 is arranged corresponding to the terminal I/F 20 of the battery pack 2 (see FIG. 3). As shown in FIG. 14, the terminal unit 104 includes a plurality of charger-side terminals 118 and a terminal holder 120. The charger-side terminals 118 are arranged corresponding to the battery-side terminals of the battery pack 2. The terminal holder 120 includes a base 120a that holds the charger-side terminals 118, a plurality of side walls 120b extending along the front-rear direction and the up-down direction, and a front wall 120c extending along the left-right direction and the up-down direction.

As shown in FIG. 13, the hook 106 is attached to a front portion of the terminal unit 104. The hook 106 is supported by the terminal unit 104 so as to be rotatable about a rotation axis extending in the left-right direction. A width of the hook 106 in the left-right direction is slightly smaller than the width of the hook engaging groove 30 of the battery pack 2 in the left-right direction. A right engaging part 106a is arranged at the right upper end of the hook 106. A left engaging part 106b is arranged at the left upper end of the hook 106. An operation part 106c which the user can press to operate is arranged at a front lower portion of the hook 106. The hook 106 is biased by a torsion spring (not shown) in a direction along which the right engaging part 106a and the left engaging part 106b move rearward from the front side.

Figure 15:
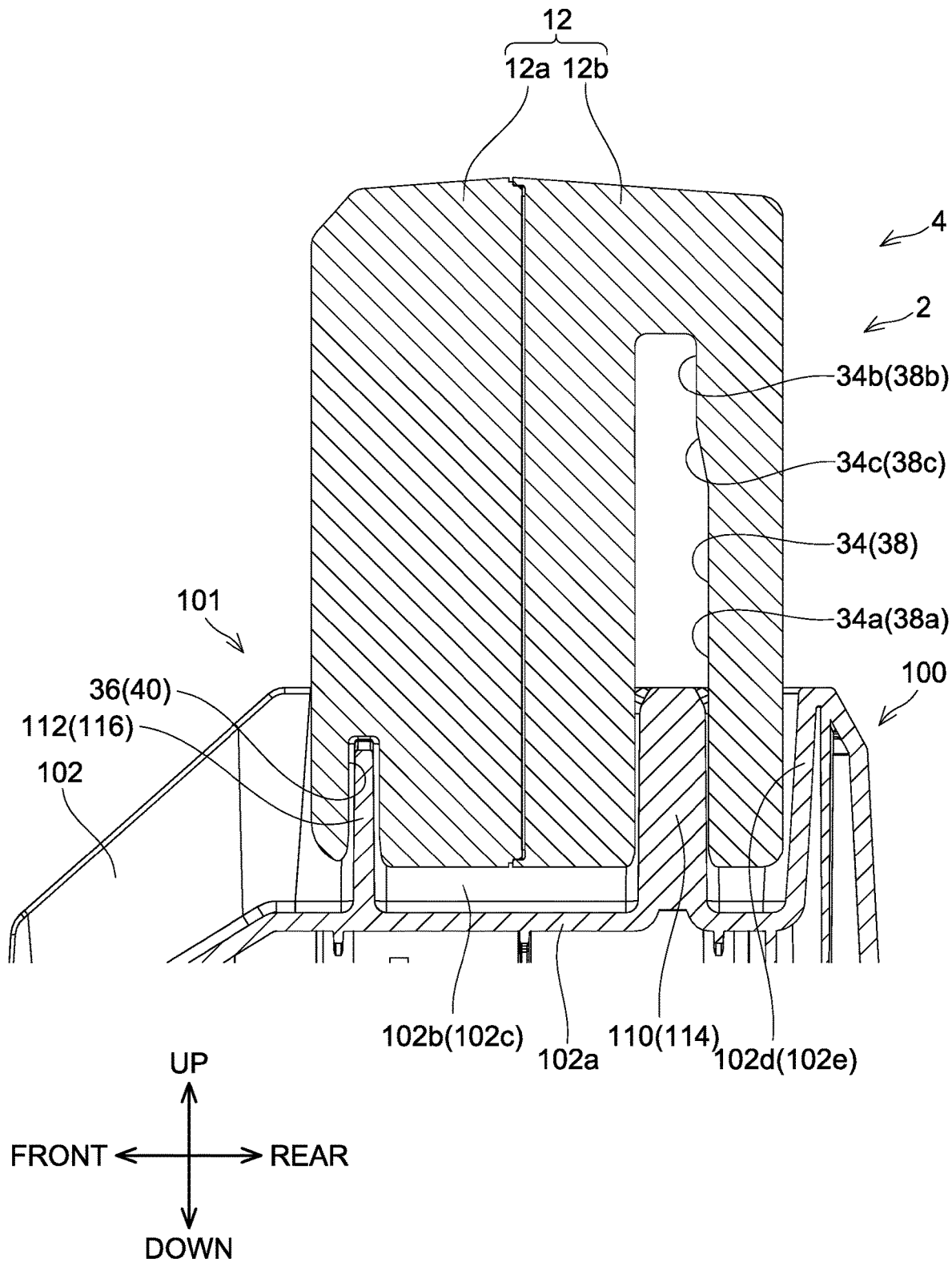
FIG. 15 is a vertical cross-sectional view of the first right guide groove 34 and a second right guide groove 36 and their vicinity with the battery pack 2 of the embodiment attached to the charger 100.
Figure 16:
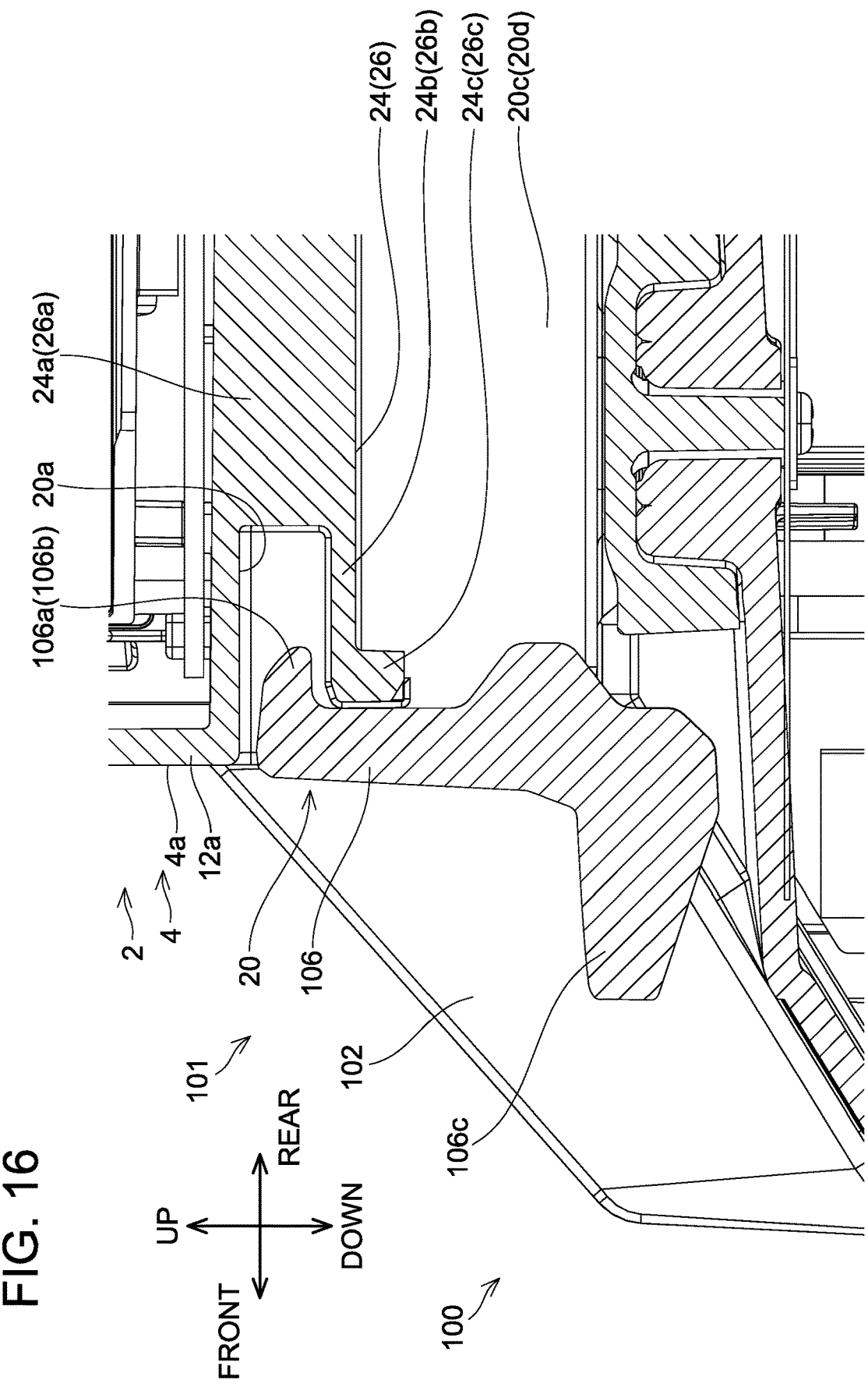
FIG. 16 is a vertical cross-sectional view of the right engaging part 24 and its vicinity with the battery pack 2 of the embodiment attached to the charger 100.
Figure 17:
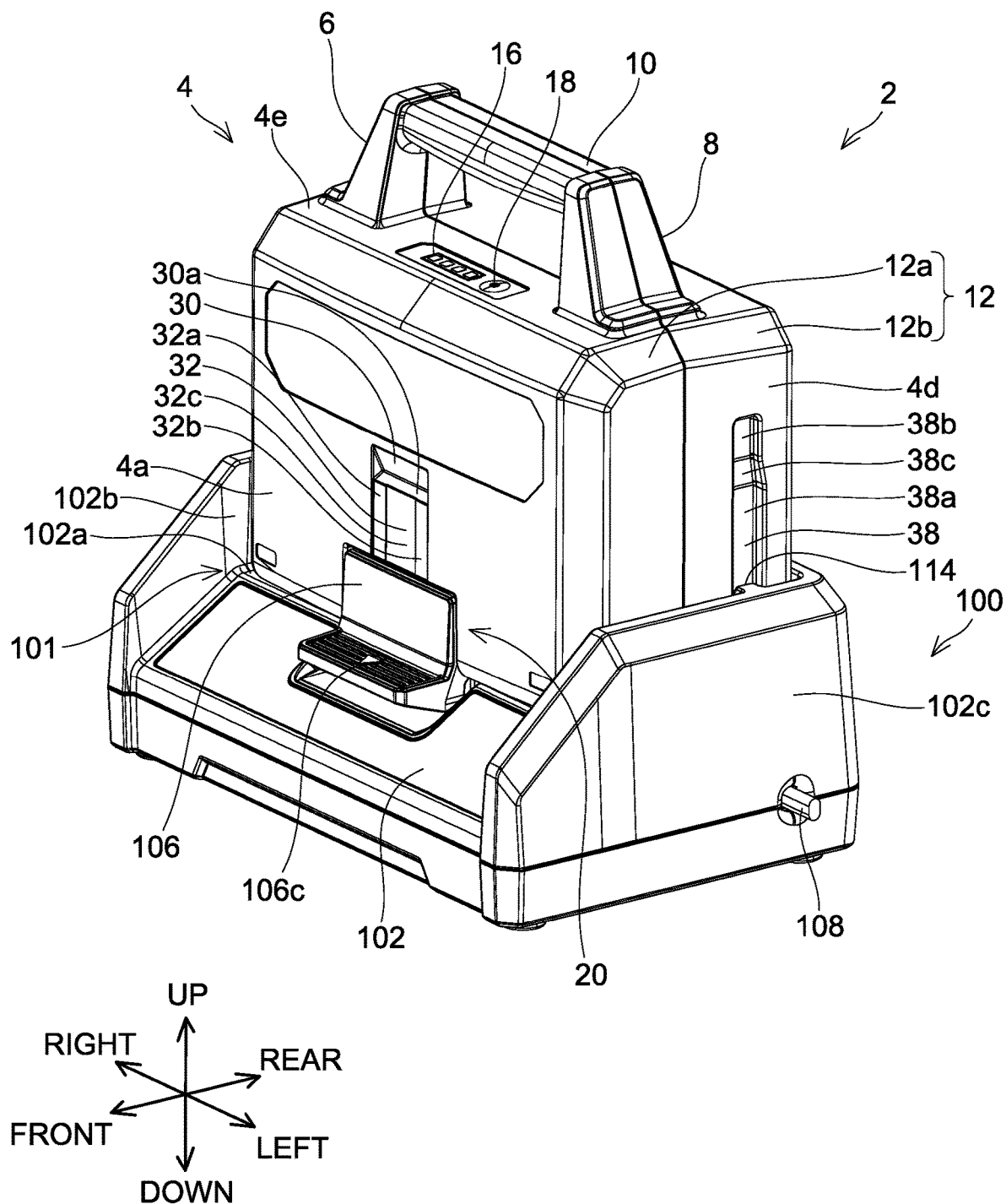
FIG. 17 is a perspective view of the state in which the battery pack 2 of the embodiment is attached to the charger 100, as viewed from the front left upper side.

As shown in FIG. 15, when the battery pack 2 is to be attached to the battery pack mount 101, the battery pack 2 is slid downward from above the battery pack mount 101 in the state in which the first right guide groove 34, the second right guide groove 36, the first left guide groove 38, and the second left guide groove 40 of the battery pack 2 are respectively aligned with the first right guide rib 110, the second right guide rib 112, the first left guide rib 114, and the second left guide rib 116 of the battery pack mount 101, and the battery pack 2 is thereby mounted on the upper surface of the mounting portion 102a. In doing so, the terminal receptacles 22 of the terminal I/F 20 of the battery pack 2 (see FIG. 3) enter into spaces defined by the side walls 120b and the front wall 120c of the battery pack mount 101 (see FIG. 14), and the charger-side terminals 118 of the battery pack mount 101 penetrate through the terminal openings 22e of the terminal I/F 20 of the battery pack 22 (see FIG. 3) and enter into the terminal receptacles 22. As a result of this, the charger-side terminals 118 of the battery pack mount 101 are electrically connected to the battery-side terminals of the battery pack 2. Further, as shown in FIG. 16, the right engaging part 106a and the left engaging part 106b of the hook 106 engage with the right engaging part 24 and the left engaging part 26 of the terminal I/F 20 of the battery pack 2, respectively, and the battery pack 2 is thereby fixed to the battery pack mount 101. Due to this, the battery pack 2 is attached to the battery pack mount 101 as shown in FIG. 17. When the battery pack 2 is attached to the battery pack mount 101, the charger 100 can charge the battery pack 2 using power supplied through the power cable 108.

In the battery pack mount 101, a height in the up-down direction from the mounting portion 102a to the upper ends of the right wall 102b and the left wall 102c is smaller than half a height of the body 4 of the battery pack 2 in the up-down direction. As such, a length of the first right guide rib 110 and the first left guide rib 114 of the battery pack mount 101 in the up-down direction is much smaller than the length of the first right guide groove 34 and the first left guide groove 38 of the battery pack 2 in the up-down direction. Due to this, if the battery pack 2 does not have the second right guide groove 36 or the second left guide groove 40 and the battery pack mount 101 does not have the second right guide rib 112 or the second left guide rib 116, there is a risk that the battery pack 2 could be attached to the battery pack mount 101 with the battery pack 2 tilted in the front-rear direction. In this case, since the battery-side terminals of the battery pack 2 and the charger-side terminals 118 of the battery pack mount 101 are not electrically connected, the charger 100 may not be able to charge the battery pack 2. Contrary to this, in the present embodiment, since the battery pack 2 includes the second right guide groove 36 and the second left guide groove 40 and the battery pack mount 101 includes the second right guide rib 112 and the second left guide rib 116, the battery pack 2 can be suppressed from being attached to the battery pack mount 101 with the battery pack 2 tilted in the front-rear direction. A situation in which the charger 100 cannot charge the battery pack 2 can be suppressed from occurring.

(Attachment to Electric Device 200)

Figure 18:
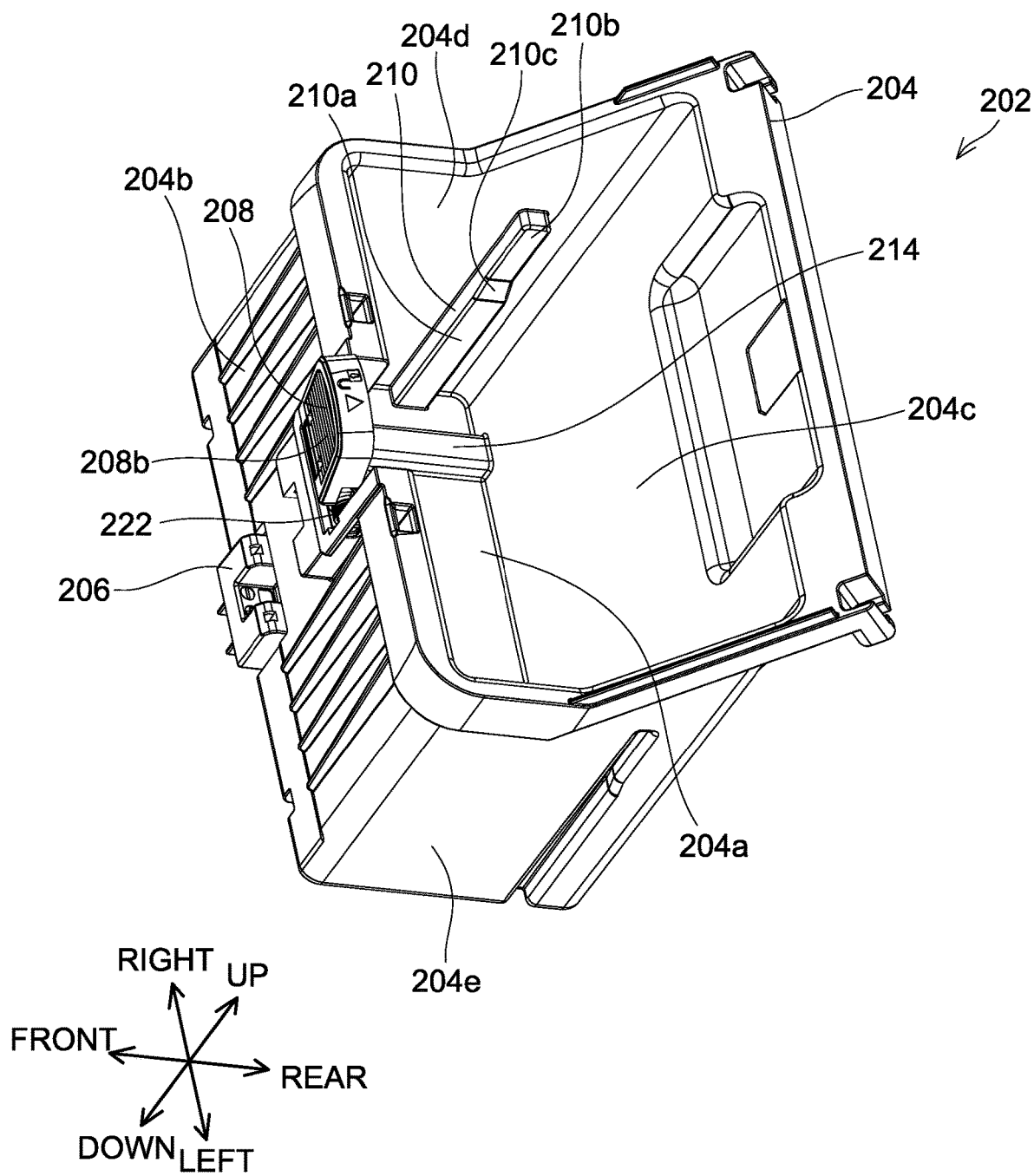
FIG. 18 is a perspective view of a battery pack mount 202 to and from which the battery pack 2 of the embodiment can be attached and detached, as viewed from the front left upper side.

As shown in FIG. 18, the battery pack mount 202 of the electric device 200 (see FIG. 1) includes a battery box 204, a terminal unit 206, and a hook 208. The battery box 204 has a box shape with its upper side open. The battery box 204 includes a lower plate 204a, a front plate 204b, a rear plate 204c, a right plate 204d, and a left plate 204e.

Figure 19:
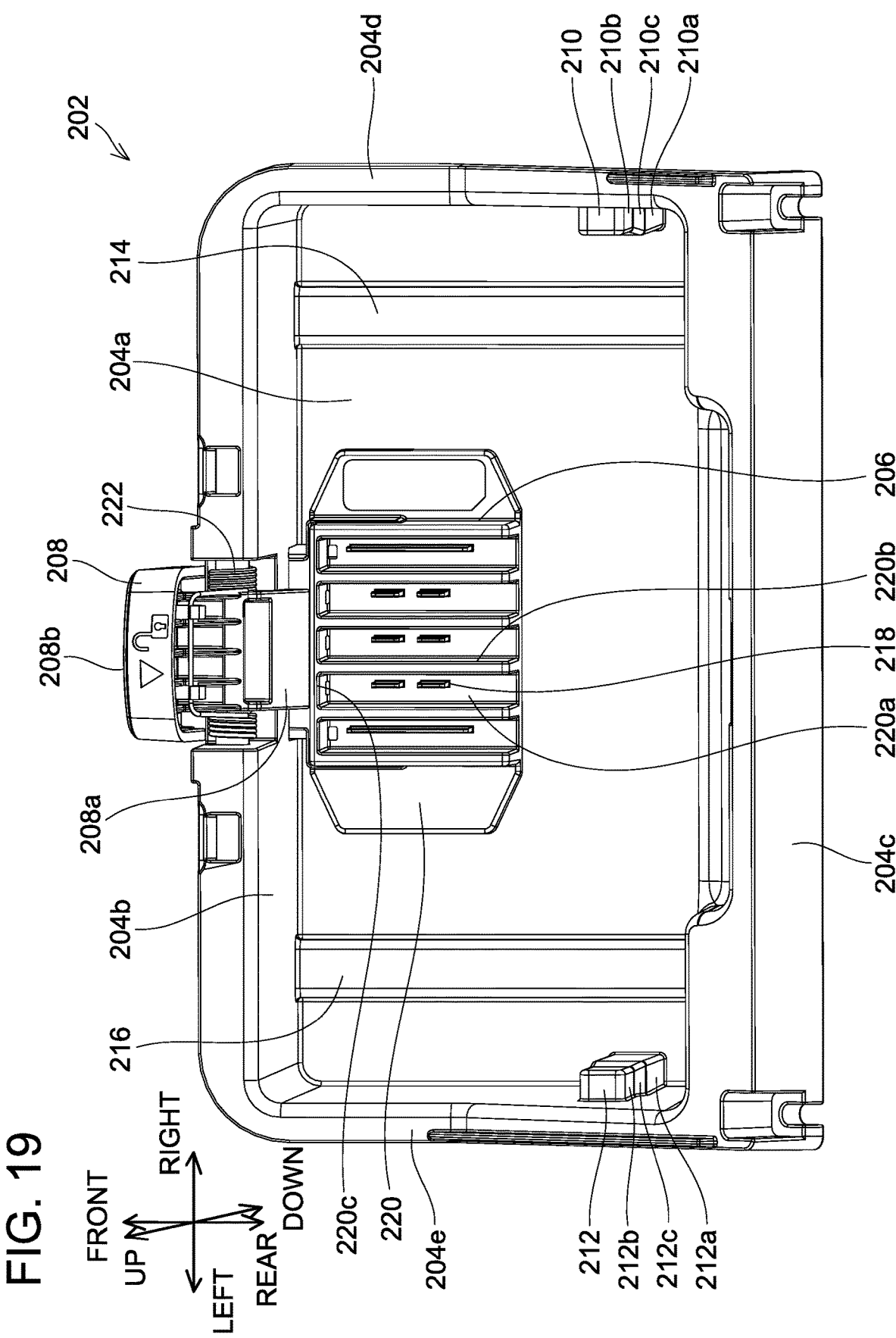
FIG. 19 is a perspective view of the battery pack mount 202 to and from which the battery pack 2 of the embodiment can be attached and detached, as viewed from the rear right upper side.

A right guide rib 210 protruding leftward is arranged on a left surface of the right plate 204d. The right guide rib 210 is arranged corresponding to the first right guide groove 34 of the battery pack 2 (see FIG. 2). As shown in FIG. 19, a left guide rib 212 protruding rightward is arranged on a right surface of the left plate 204e. The left guide rib 212 is arranged corresponding to the first left guide groove 38 of the battery pack 2 (see FIG. 3). The right guide rib 210 and the left guide rib 212 are at positions and have shapes that are left-right symmetric to each other. As shown in FIG. 18, the right guide rib 210 includes a lower guide portion 210a, an upper guide portion 2101), and an intermediate guide portion 210c. The lower guide portion 210a is a rib having a substantially rectangular cross-sectional shape, and extends upward from an upper surface of the lower plate 204a. The lower guide portion 210a has a substantially constant width in the front-rear direction and a substantially constant height in the left-right direction. The width of the lower guide portion 210a in the front-rear direction and the height thereof in the left-right direction are respectively slightly smaller than the width of the lower guide portion 34a of the first right guide groove 34 of the battery pack 2 (see FIG. 2) in the front-rear direction and the depth thereof in the left-right direction. The upper guide portion 210b is a rib having a substantially rectangular cross-sectional shape, and extends upward in the up-down direction above the lower guide portion 210a. The upper guide portion 210b has a substantially constant width in the front-rear direction and a substantially constant height in the left-right direction. The width of the upper guide portion 210b in the front-rear direction and the height thereof in the left-right direction are respectively slightly smaller than the width of the upper guide portion 34b of the first right guide groove 34 of the battery pack 2 (see FIG. 2) in the front-rear direction and the depth thereof in the left-right direction. The intermediate guide portion 210c is a rib having a substantially rectangular cross-sectional shape, and connects the upper end of the lower guide portion 210a and the lower end of the upper guide portion 210b. A width of the intermediate guide portion 210c in the front-rear direction and a height thereof in the left-right direction are respectively slightly smaller than the width of the intermediate guide portion 34c of the first right guide groove 34 of the battery pack 2 (see FIG. 2) in the front-rear direction and the depth thereof in the left-right direction. A front surface of the lower guide portion 210a, a front surface of the intermediate guide portion 210c, and a front surface of the upper guide portion 210b are arranged on the substantially same plane. As shown in FIG. 19, the left guide rib 212 has the same configuration as the right guide rib 210. The left guide rib 212 includes a lower guide portion 212a, an upper guide portion 212b, and an intermediate guide portion 212c.

A right mounting rib 214 and a left mounting rib 216 protruding upward are arranged on an upper surface of the lower plate 204a. The right mounting rib 214 and the left mounting rib 216 extend in the front-rear direction from a rear surface of the front plate 204b to a front surface of the rear plate 204c. When the battery pack 2 is attached to the battery pack mount 202, an upper surface of the right mounting rib 214 and an upper surface of the left mounting rib 216 come into contact with the bottom surface 4f of the body 4 of the battery pack 2 (see FIG. 3). The right mounting rib 214 is arranged close to the right end of the lower plate 204a and arranged between the right end of the lower plate 204a and the center of the lower plate 204a in the left-right direction. The left mounting rib 216 is arranged close to the left end of the lower plate 204a and arranged between the left end of the lower plate 204a and the center of the lower plate 204a in the left-right direction.

The terminal unit 206 is arranged corresponding to the terminal I/F 20 of the battery pack 2 (see FIG. 3). The terminal unit 206 includes a plurality of device-side terminals 218 and a terminal holder 220. The device-side terminals 218 are arranged corresponding to the battery-side terminals of the battery pack 2. The terminal holder 220 includes a base 220a that holds the device-side terminals 218, a plurality of side walls 220b extending along the front-rear direction and the up-down direction, and a front wall 220c extending along the left-right direction and the up-down direction.

As shown in FIG. 18, the hook 208 is attached to the center area of the front plate 204b in the left-right direction near the upper end of the front plate 204b. The hook 208 is supported by the front plate 204b so as to be rotatable about a rotation axis extending in the left-right direction. A width of the hook 208 in the left-right direction is slightly smaller than the width of the hook engaging groove 30 of the battery pack 2 in the left-right direction. As shown in FIG. 19, an engaging part 208a is arranged at the lower end of the hook 208. An operation part 208b which the user can press to operate is arranged at the upper end of the hook 208. The hook 208 is biased by a torsion spring 222 in a direction along which the engaging part 208a moves rearward from the front side.

Figure 20:
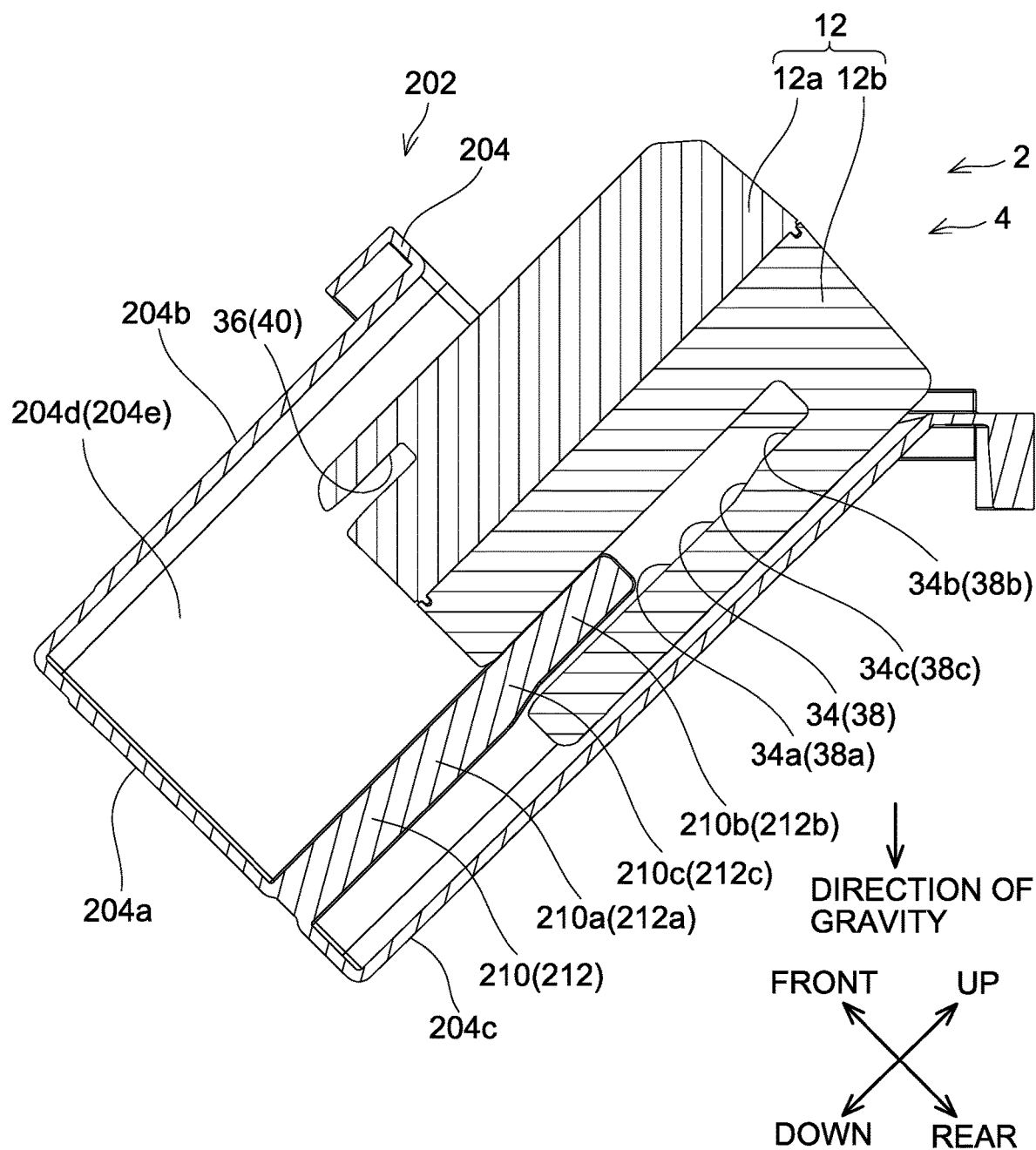
FIG. 20 is a vertical cross-sectional view of the first right guide groove 34 and the second right guide groove 36 and their vicinity in the state in which an upper guide portion 210*b* of a right guide rib 210 of the battery pack mount 202 has entered into a lower guide portion 34*a* of the first right guide groove 34 in the battery pack 2 of the embodiment.
Figure 21:
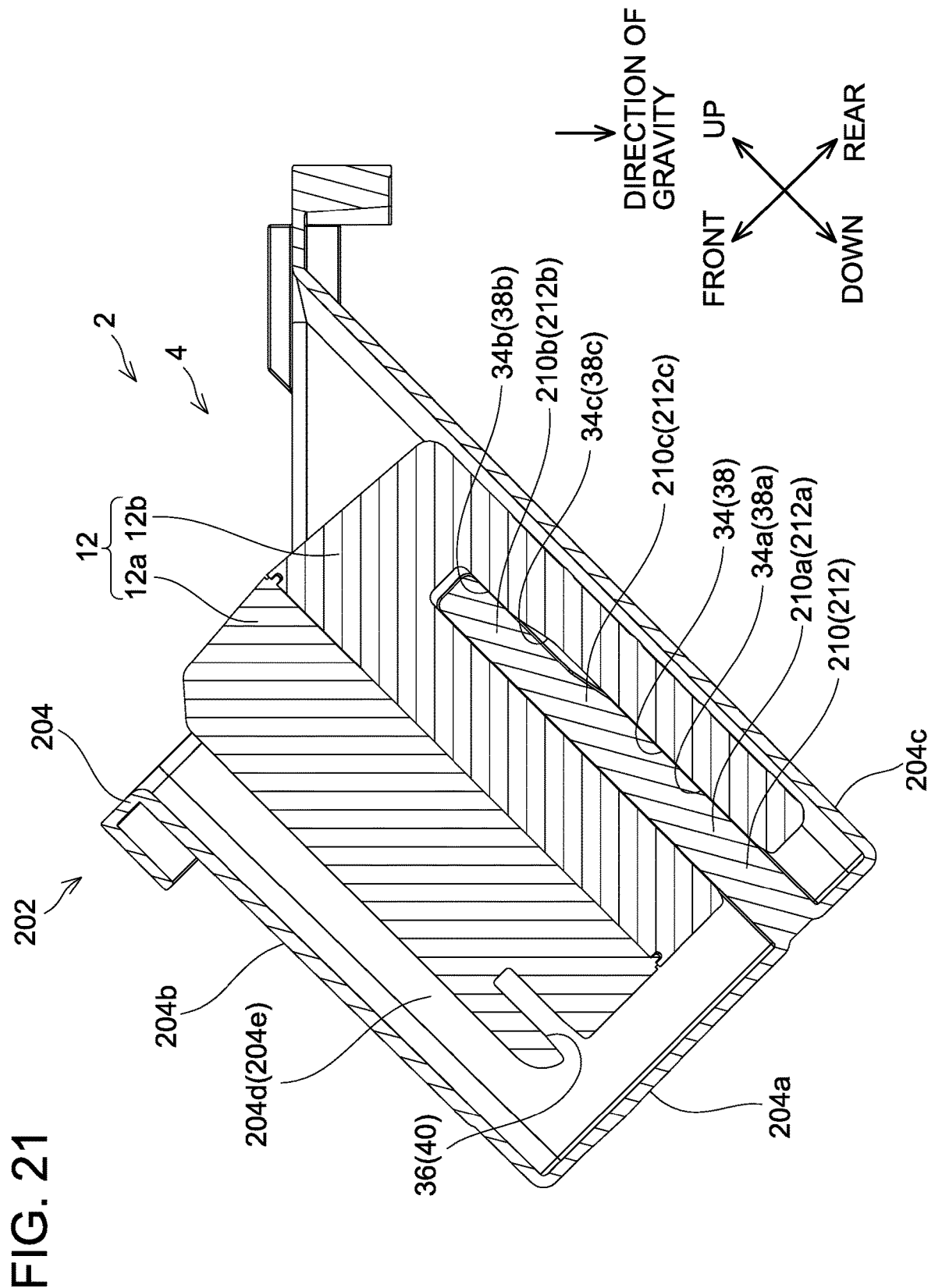
FIG. 21 is a vertical cross-sectional view of the first right guide groove 34 and the second right guide groove 36 and their vicinity with the battery pack 2 of the embodiment attached to the battery pack mount 202.

When the battery pack 2 is to be attached to the battery pack mount 202, the battery pack 2 is slid downward from above the battery pack mount 202 in the state in which the first right guide groove 34 (see FIG. 2) and the first left guide groove 38 (see FIG. 3) of the battery pack 2 are respectively aligned with the right guide rib 210 and the left guide rib 212 of the battery pack mount 202, and the battery pack 2 is thereby mounted on the upper surfaces of the right mounting rib 214 and the left mounting rib 216. As shown in FIG. 20, in the state in which the upper guide portions 210b, 212b of the right guide rib 210 and the left guide rib 212 have entered into the lower guide portions 34a, 38a of the first right guide groove 34 and the first left guide groove 38, the battery pack 2 can move slightly in the front-rear direction and the left-right direction with respect to the battery pack mount 202, thus the user can smoothly move the battery pack 2 when the user moves the battery pack 2 with respect to the battery pack mount 202 in the up-down direction. Further, as shown in FIG. 21, in the state in which the upper guide portions 210b, 212b of the right guide rib 210 and the left guide rib 212 have entered into the upper guide portions 34b, 38h of the first right guide groove 34 and the first left guide groove 38 and the lower guide portions 210a, 212a of the right guide rib 210 and the left guide rib 212 have entered into the lower guide portions 34a, 38a of the first right guide groove 34 and the first left guide groove 38, movement of the battery pack 2 in the front-rear direction and the left-right direction with respect to the battery pack mount 202 is restricted, thus the battery pack 2 can firmly be fixed in the front-rear direction and the left-right direction. Further, as shown in FIGS. 20 and 21, when the battery pack mount 202 is tilted with respect to a direction of gravity such that the direction of gravity is oriented toward the rear lower side of the battery pack mount 202, the front surfaces of the right guide rib 210 and the left guide rib 212 respectively come into contact with the front side surfaces of the first right guide groove 34 and the first left guide groove 38 and slide against them. Since the front surfaces of the right guide rib 210 and the left guide rib 212 have substantially flat surface shapes and the front side surfaces of the first right guide groove 34 and the first left guide groove 38 also have substantially flat surface shapes, the user can smoothly move the battery pack 2 upon moving the battery pack 2 in the up-down direction with respect to the battery pack mount 202. The right guide rib 210 and the left guide rib 212 of the battery pack mount 202 each have a length in the up-down direction that is greater than half the length of the body 4 of the battery pack 2 in the up-down direction. Due to this, even if the battery pack mount 202 does not include the second right guide rib 112 or the second left guide rib 116 which the charger 100 has, the battery pack 2 can be suppressed from being attached to the battery pack mount 202 with the battery pack 2 tilted in the front-rear direction.

Figure 22:
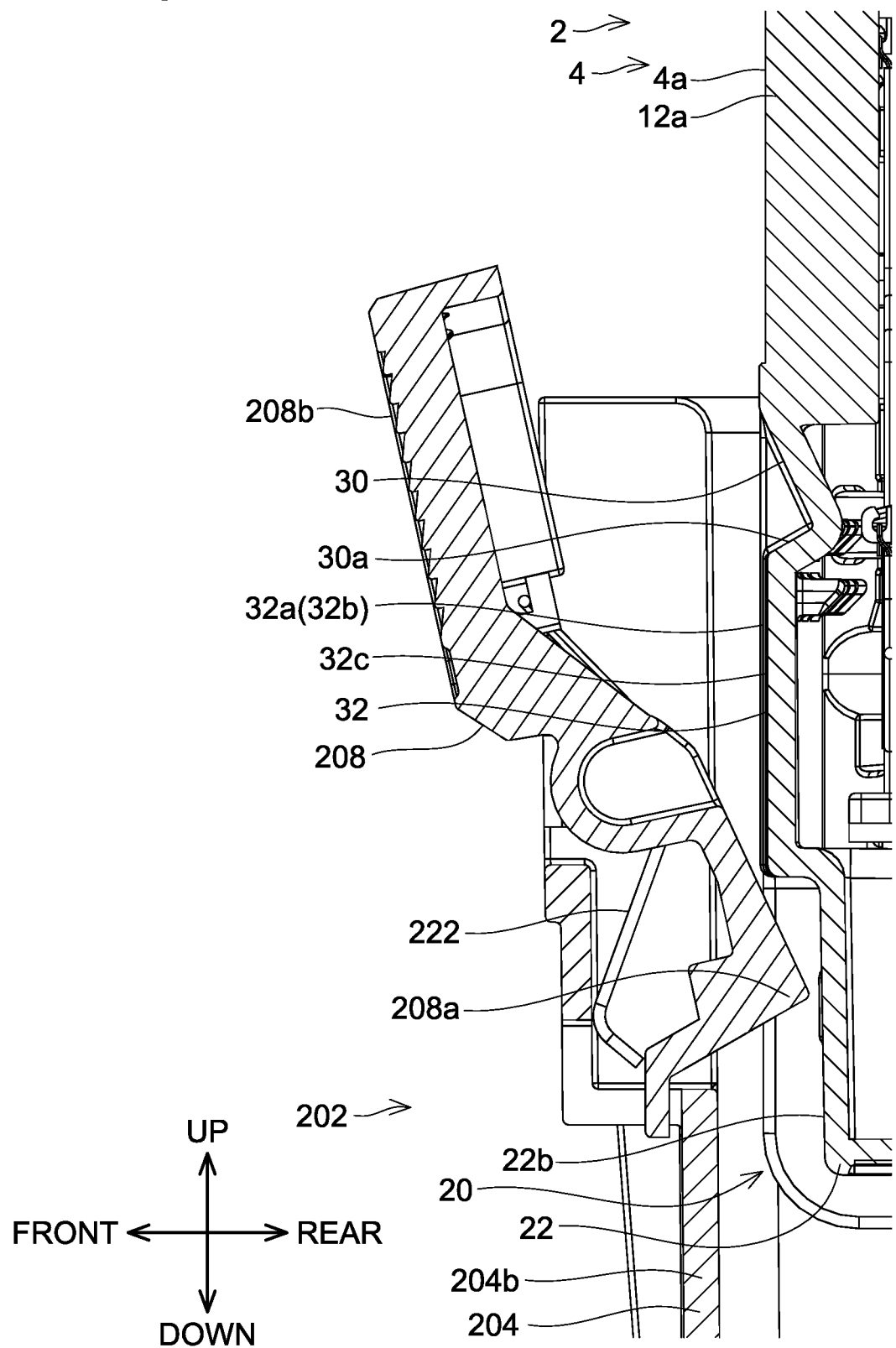
FIG. 22 is a vertical cross-sectional view of the terminal I/F 20, a hook sliding groove 32, a hook engaging groove 30 and their vicinity with an engaging part 208*a* of a hook 208 of the battery pack mount 202 passing the terminal I/F 20 in the battery pack 2 of the embodiment.
Figure 23:
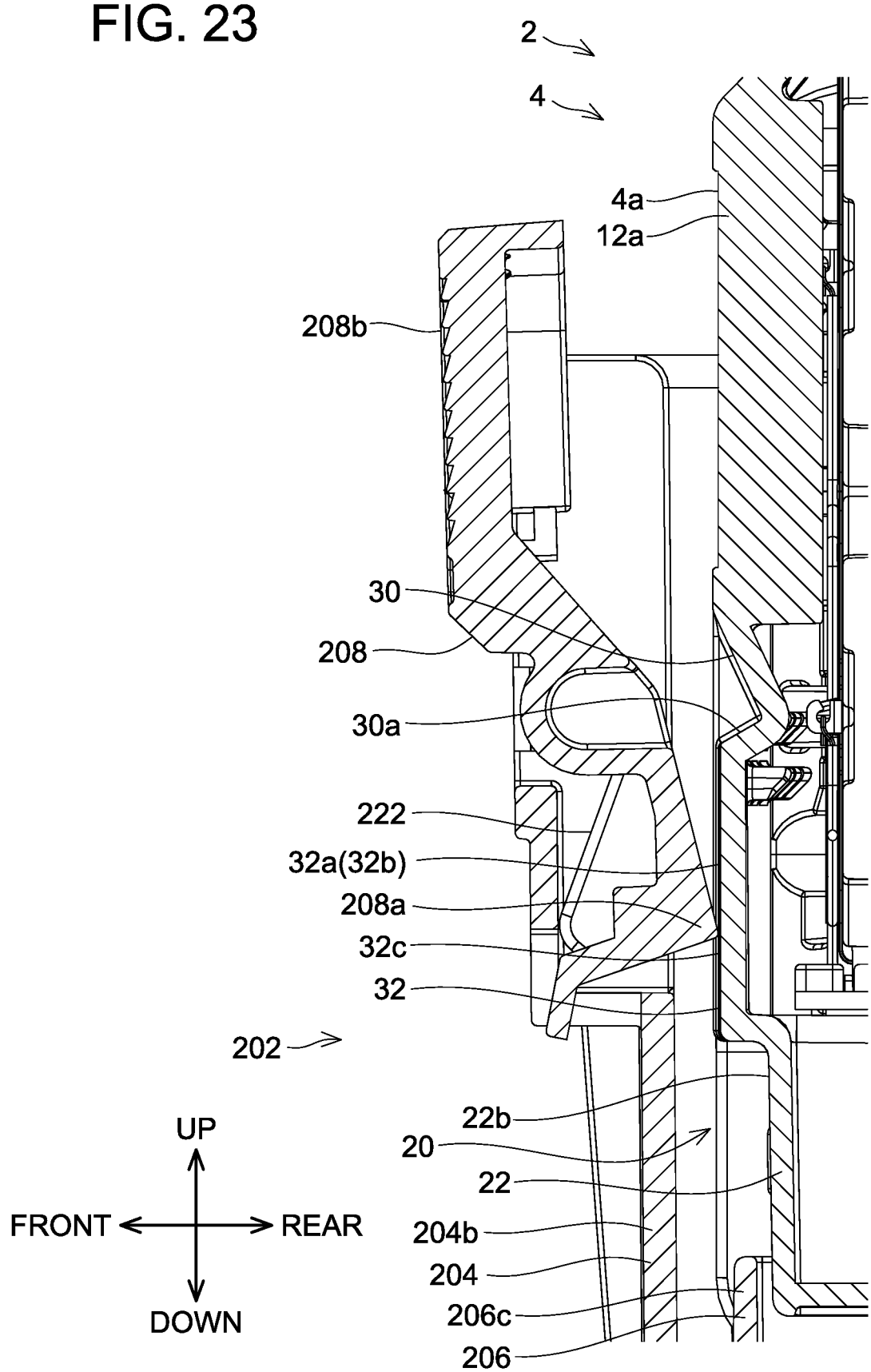
FIG. 23 is a vertical cross-sectional view of the terminal I/F 20, the hook sliding groove 32, and the hook engaging groove 30 and their vicinity with the engaging part 208*a* of the hook 208 of the battery pack mount 202 passing the hook sliding groove 32 in the battery pack 2 of the embodiment.
Figure 24:
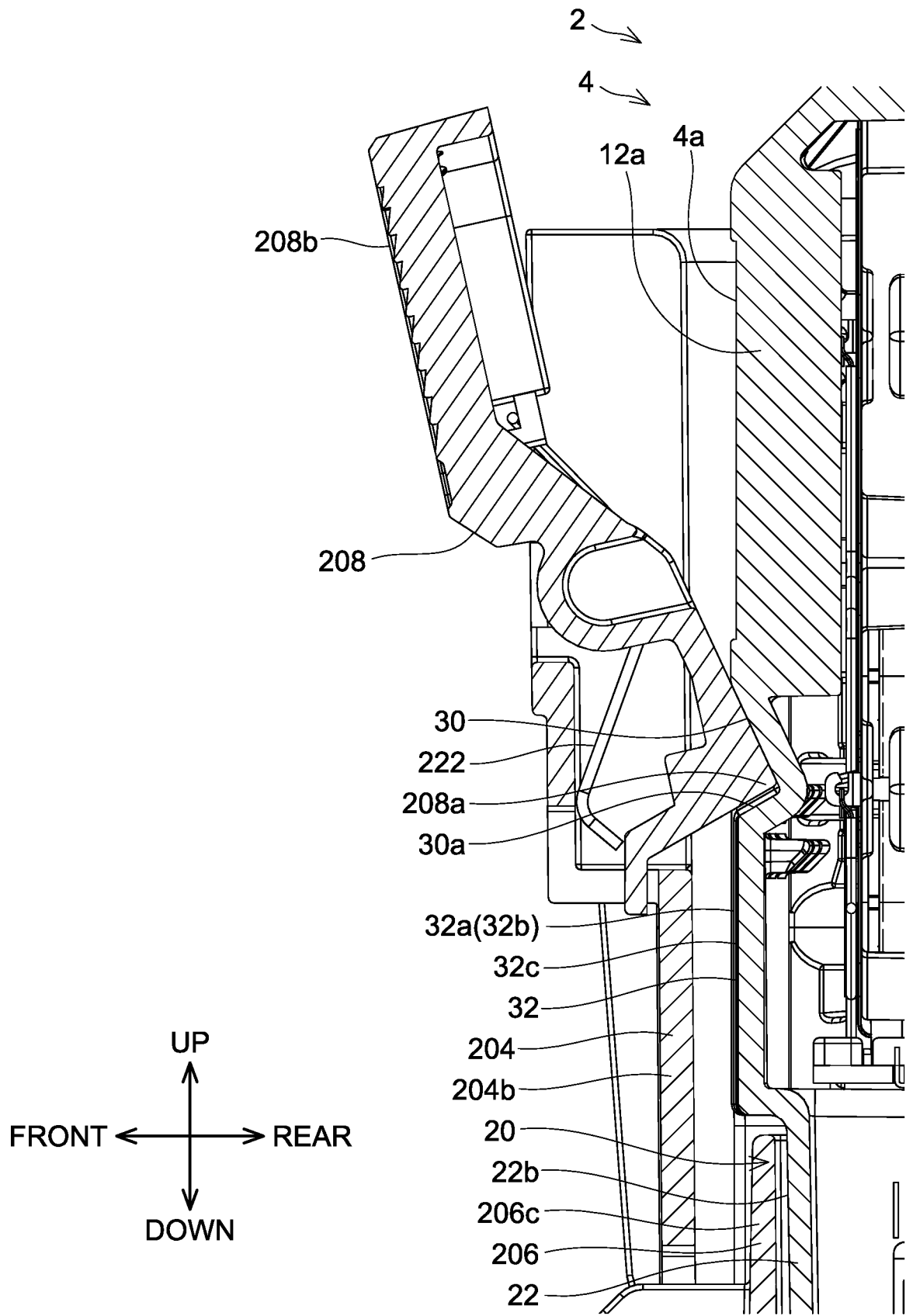
FIG. 24 is a vertical cross-sectional view of the terminal I/F 20, the hook sliding groove 32, and the hook engaging groove 30 and their vicinity with the battery pack 2 of the embodiment attached to the battery pack mount 202.

When the battery pack 2 is to be attached to the battery pack mount 202, the engaging part 208a of the hook 208 firstly passes the terminal I/F 20 of the battery pack 2 as shown in FIG. 22, then passes the hook sliding groove 32 of the battery pack 2 as shown in FIG. 23, and thereafter engages with the hook engaging groove 30 of the battery pack 2 as shown in FIG. 24. As shown in FIG. 22, when the engaging part 208a passes the terminal I/F 20, the engaging part 208a does not come into contact with the front surfaces 22b of the terminal receptacles 22 of the terminal I/F 20. Consequently, the battery pack 2 can be suppressed from receiving sliding resistance from the hook 208 upon moving the battery pack 2 in the up-down direction with respect to the battery pack mount 202. Further, the front surfaces 22h of the terminal receptacles 22 can be suppressed from wearing out due to sliding motion. As shown in FIG. 23, when the engaging part 208a passes the hook sliding groove 32, the engaging part 208a comes into contact with the right sliding surface 32a and the left sliding surface 32b but does not come into contact with the center surface 32c. Due to this, the sliding resistance that the battery pack 2 receives from the hook 208 upon moving the battery pack 2 in the up-down direction with respect to the battery pack mount 202 can be reduced. Further, the center surface 32c of the hook sliding groove 32 can be suppressed from wearing out by the sliding motion.

Figure 25:
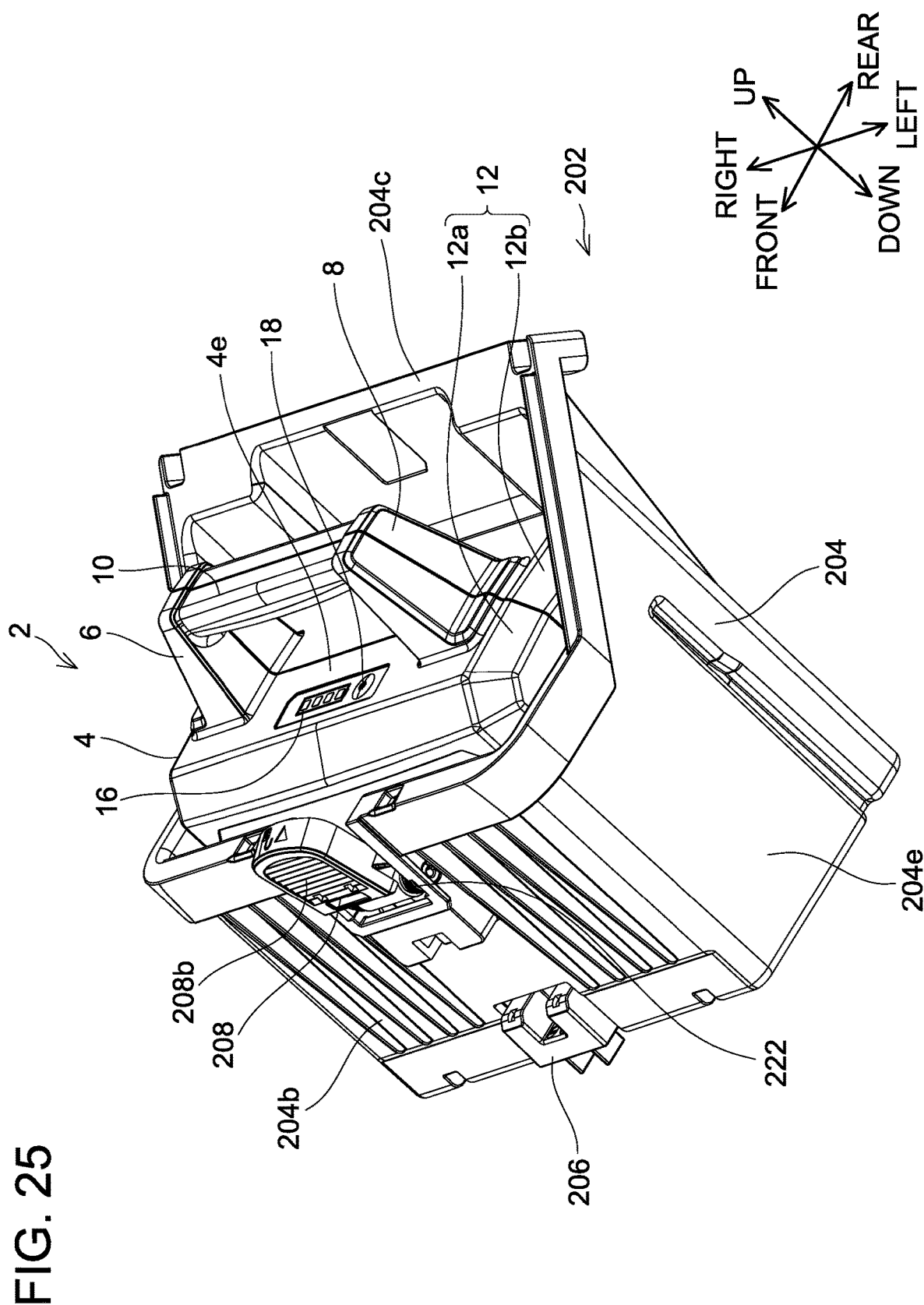
FIG. 25 is a perspective view of the state in which the battery pack 2 of the embodiment is attached to the battery pack mount 202.

When the battery pack 2 is mounted on the upper surfaces of the right mounting rib 214 and the left mounting rib 216, the terminal receptacles 22 of the terminal I/F 20 of the battery pack 2 (see FIG. 3) enter into spaces defined by the side walls 220h and the front wall 220c of the battery pack mount 202 (see FIG. 19), and the device-side terminals 218 of the battery pack mount 202 penetrate through the terminal openings 22e of the terminal I/F 20 of the battery pack 2 (see FIG. 3) and enter into the terminal receptacles 22. Due to this, the device-side terminals 218 of the battery pack mount 202 are electrically connected to the battery-side terminals of the battery pack 2. Further, as shown in FIG. 24, the engaging part 208a of the hook 208 engages with the hook engaging groove 30 of the battery pack 2, by which the battery pack 2 is fixed to the battery pack mount 202. Due to this, the battery pack 2 is attached to the battery pack mount 202 as shown in FIG. 25. The electric device 200 (see FIG. 1) can operate by using power supplied from the battery pack 2 when the battery pack 2 is attached to the battery pack mount 202.

(Variants)

In the above embodiment, the terminal cover 28 may not include the finger receiving protrusion 28e. Alternatively, the terminal cover 28 may include a recessed finger pull portion (not shown) instead of the finger receiving protrusion 28e. The terminal cover 28 may be configured to be attached to and detached from the terminal I/F 20 by a method other than sliding it in the front-rear direction. The terminal cover 28 may not include the upper slits 28l, 28p or the lower slits 28m, 28q, and may not include the right engaging protrusion 28k or the left engaging protrusion 28o. The terminal cover 28 may not include the front plate 28b, the right plate 28c, or the left plate 28d.

In the above embodiment, the first right guide groove 34 and the first left guide groove 38 may each have a substantially constant width in the front-rear direction and/or a substantially constant depth in the left-right direction from the lower end to the upper end. The second right guide groove 36 and the second left guide groove 40 may have the length in the up-down direction, the width in the front-rear direction, and/or the depth in the left-right direction that are greater than those of the first right guide groove 34 and the first left guide groove 38. The first right guide groove 34 and the second right guide groove 36 may be arranged at positions different from those in the above embodiment on the right surface 4c of the body 4. The first left guide groove 38 and the second left guide groove 40 may be arranged at positions different from those in the above embodiment on the left surface 4d of the body 4. The battery pack 2 may not include the right support 6, the left support 8, or the grip 10.

In the above embodiment, the right sliding surface 32a and the left sliding surface 32b of the hook sliding groove 32 may be arranged on the substantially same plane with the front surface 4a of the body 4, or may be arranged by being inclined with respect to the up-down direction. The hook sliding groove 32 may include sliding surface(s) having shape(s) and/or arrangement different from those of the right sliding surface 32a and the left sliding surface 32b, and may include non-sliding surface(s) having shape(s) and/or arrangement different from those of the center surface 32c. The depth of the hook engaging groove 30 in the front-rear direction may be greater than the depth of the front surfaces 22b of the terminal receptacles 22 in the front-rear direction.

As above, in one or more embodiments, the battery pack 2 is configured to be attached to the battery pack mount 101 or 202 by moving the battery pack 2 downward with respect to the battery pack mount 101 or 202, and to be detached from the battery pack mount 101 or 202 by moving the battery pack 2 upward with respect to the battery pack mount 101 or 202. The battery pack 2 comprises the casing 12. The casing 12 includes the first right guide groove 34 (an example of the first guide groove) and the second right guide groove 36 (an example of the second guide groove) on the right surface 4c and includes the first left guide groove 38 (an example of the first guide groove) and the second left guide groove 40 (an example of the second guide groove) on the left surface 4d, the first right guide groove 34 extending upward from the lower end of the right surface 4c, the first left guide groove 38 extending upward from the lower end of the left surface 4d, the second right guide groove 36 extending upward from the lower end of the right surface 4c, and the second left guide groove 40 extending upward from the lower end of the left surface 4d. The length of the first right guide groove 34 in the up-down direction and the length of the second right guide groove 36 in the up-down direction are different, and the length of the first left guide groove 38 in the up-down direction and the length of the second left guide groove 40 in the up-down direction are different.

With the above battery pack 2, the battery pack 2 can be suppressed from entering the state of being tilted in the front-rear direction when the battery pack 2 is to be attached to the battery pack mount 101 on which the first right guide rib 110, the first left guide rib 114, the second right guide rib 112, and the second left guide rib 116 corresponding to the first right guide groove 34, the first left guide groove 38, the second right guide groove 36, and the second left guide groove 40, respectively, are arranged. Further, with the above battery pack 2, since the length of the second right guide groove 36 in the up-down direction is smaller than the length of the first right guide groove 34 in the up-down direction and the length of the second left guide groove 40 in the up-down direction is smaller than the length of the first left guide groove 38 in the up-down direction, an internal space of the casing 12 can accordingly be suppressed from being reduced.

In one or more embodiments, the length of the second right guide groove 36 in the up-down direction is smaller than half the length of the first right guide groove 34 in the up-down direction, and the length of the second left guide groove 40 in the up-down direction is smaller than half the length of the first left guide groove 38 in the up-down direction.

According to the above configuration, the length of the second right guide groove 36 and the second left guide groove 40 in the up-down direction can significantly be reduced, and the internal space of the casing 12 can accordingly be suppressed from being reduced.

In one or more embodiments, in the front-rear direction, the first right guide groove 34 is arranged between the rear end of the right surface 4c and the center of the right surface 4c, and the first left guide groove 38 is arranged between the rear end of the left surface 4d and the center of the left surface 4d. In the front-rear direction, the second right guide groove 36 is arranged between the front end of the right surface 4c and the center of the right surface 4c, and the second left guide groove 40 is arranged between the front end of the left surface 4d and the center of the left surface 4d.

According to the above configuration, the battery pack 2 can further be suppressed from entering the state of being tilted in the front-rear direction upon attaching the battery pack 2 to the battery pack mount 101 on which the first right guide rib 110, the first left guide rib 114, the second right guide rib 112, and the second left guide rib 116 are arranged. Further, according to the above configuration, the internal space of the casing 12 can be suppressed from being reduced at the center area of the casing 12 in the front-rear direction.

In one or more embodiments, the width of the first right guide groove 34 in the front-rear direction and the width of the second right guide groove 36 in the front-rear direction are different at the lower end of the right surface 4c, and the width of the first left guide groove 38 in the front-rear direction and the width of the second left guide groove 40 in the front-rear direction are different at the lower end of the left surface 4d.

According to the above configuration, since the width of the second right guide groove 36 in the front-rear direction is smaller than the width of the first right guide groove 34 in the front-rear direction and the width of the second left guide groove 40 in the front-rear direction is smaller than the width of the first left guide groove 38 in the front-rear direction, the internal space of the casing 12 can accordingly be suppressed from being reduced.

In one or more embodiments, the width of the second right guide groove 36 in the front-rear direction is smaller than half the width of the first right guide groove 34 in the front-rear direction at the lower end of the right surface 4c, and the width of the second left guide groove 40 in the front-rear direction is smaller than half the width of the first left guide groove 38 in the front-rear direction at the lower end of the left surface 4d.

According to the above configuration, the widths of the second right guide groove 36 and the second left guide groove 40 in the front-rear direction can significantly be reduced, and the internal space of the casing 12 can accordingly be suppressed from being reduced.

In one or more embodiments, the length of the second right guide groove 36 in the up-down direction is smaller than the length of the first right guide groove 34 in the up-down direction, and the length of the second left guide groove 40 in the up-down direction is smaller than the length of the first left guide groove 38 in the up-down direction. At the lower end of the right surface 4c, the width of the second right guide groove 36 in the front-rear direction is smaller than the width of the first right guide groove 34 in the front-rear direction, and at the lower end of the left surface 4d, the width of the second left guide groove 40 in the front-rear direction is smaller than the width of the first left guide groove 38 in the front-rear direction.

According to the above configuration, the internal space of the casing 12 can be suppressed from being reduced in vicinities of the second right guide groove 36 and the second left guide groove 40.

In one or more embodiments, the first right guide groove 34 includes the lower guide portion 34a extending upward from the lower end of the right surface 4c, the upper guide portion 34b arranged above the lower guide portion 34a and extending along the up-down direction, and the intermediate guide portion 34c connecting the lower guide portion 34a and the upper guide portion 34b to each other. The first left guide groove 38 includes the lower guide portion 38a extending upward from the lower end of the left surface 4d, the upper guide portion 38h arranged above the lower guide portion 38a and extending along the up-down direction, and the intermediate guide portion 38c connecting the lower guide portion 38a and the upper guide portion 38b to each other. The width of the upper guide portion 34b in the front-rear direction is smaller than the width of the lower guide portion 34a in the front-rear direction, and the width of the upper guide portion 38b in the front-rear direction is smaller than the width of the lower guide portion 38a in the front-rear direction.

According to the above configuration, when the battery pack 2 is to be attached to the battery pack mount 202 having the right guide rib 210 and the left guide rib 212 that have shapes corresponding to the first right guide groove 34 and the first left guide groove 38, respectively, in the state in which the upper guide portion 210b being the distal end of the right guide rib 210 has entered into the lower guide portion 34a of the first right guide groove 34 and the upper guide portion 212b being the distal end of the left guide rib 212 has entered into the lower guide portion 38a of the first left guide groove 38, the battery pack 2 can move slightly in the front-rear direction with respect to the battery pack mount 202, thus the battery pack 2 can smoothly be moved in the up-down direction. Further, in the state in which the upper guide portion 210b of the right guide rib 210 has entered into the upper guide portion 34b of the first right guide groove 34 and the upper guide portion 212h of the left guide rib 212 has entered into the upper guide portion 38b of the first left guide groove 38, the movement of the battery pack 2 in the front-rear direction with respect to the battery pack mount 202 is restricted, thus the battery pack 2 can firmly be fixed in the front-rear direction.

In one or more embodiments, the depth of the upper guide portion 34h in the left-right direction is smaller than the depth of the lower guide portion 34a in the left-right direction, and the depth of the upper guide portion 38b in the left-right direction is smaller than the depth of the lower guide portion 38a in the left-right direction.

According to the above configuration, when the battery pack 2 is to be attached to the battery pack mount 202 having the right guide rib 210 and the left guide rib 212, in the state in which the upper guide portion 210b of the right guide rib 210 has entered into the lower guide portion 34a of the first right guide groove 34 and the upper guide portion 212b of the left guide rib 212 has entered into the lower guide portion 38a of the first left guide groove 38, the battery pack 2 can move slightly in the left-right direction with respect to the battery pack mount 202, thus the battery pack 2 can smoothly be moved in the up-down direction. Further, in the state in which the upper guide portion 210b of the right guide rib 210 has entered into the upper guide portion 34b of the first right guide groove 34 and the upper guide portion 212b of the left guide rib 212 has entered into the upper guide portion 38b of the first left guide groove 38, movement of the battery pack 2 in the left-right direction with respect to the battery pack mount 202 is restricted, thus the battery pack 2 can firmly be fixed in the left-right direction.

In one or more embodiments, the first right guide groove 34 include the lower guide portion 34a extending upward from the lower end of the right surface 4c, the upper guide portion 34b arranged above the lower guide portion 34a and extending in the up-down direction, and the intermediate guide portion 34c connecting the lower guide portion 34a and the upper guide portion 34b to each other. The first left guide groove 38 includes the lower guide portion 38a extending upward from the lower end of the left surface 4d, the upper guide portion 38b arranged above the lower guide portion 38a and extending along the up-down direction, and the intermediate guide portion 38c connecting the lower guide portion 38a and the upper guide portion 38b to each other. The depth of the upper guide portion 34b in the left-right direction is smaller than the depth of the lower guide portion 34a in the left-right direction, and the depth of the upper guide portion 38b in the left-right direction is smaller than the depth of the lower guide portion 38a in the left-right direction.

According to the above configuration, when the battery pack 2 is to be attached to the battery pack mount 202 having the right guide rib 210 and the left guide rib 212, in the state in which the upper guide portion 210b of the right guide rib 210 has entered into the lower guide portion 34a of the first right guide groove 34 and the upper guide portion 212b of the left guide rib 212 has entered into the lower guide portion 38a of the first left guide groove 38, the battery pack 2 can move slightly in the left-right direction with respect to the battery pack mount 202, thus the battery pack 2 can smoothly be moved in the up-down direction. Further, in the state in which the upper guide portion 210b of the right guide rib 210 has entered into the upper guide portion 34b of the first right guide groove 34 and the upper guide portion 212b of the left guide rib 212 has entered into the upper guide portion 38h of the first left guide groove 38, the movement of the battery pack 2 in the left-right direction with respect to the battery pack mount 202 is restricted, thus the battery pack 2 can firmly be fixed in the left-right direction.

In one or more embodiments, on the front side, the side surface of the lower guide portion 34a, the side surface of the upper guide portion 34b, and the side surface of the intermediate guide portion 34c are arranged on the substantially same plane, and the side surface of the lower guide portion 38a, the side surface of the upper guide portion 38b, and the side surface of the intermediate guide portion 38c are arranged on the substantially same plane.

According to the above configuration, when the battery pack 2 is to be attached to the battery pack mount 202 having the right guide rib 210 and the left guide rib 212 and being tilted with respect to the direction of gravity, the battery pack 2 can be moved smoothly in the up-down direction when the side surface of the lower guide portion 34a, the side surface of the upper guide portions 34h, and the side surface of the intermediate guide portion 34c that are arranged on the substantially same plane come into contact with and slide on the surface of the right guide rib 210 and when the side surface of the lower guide portion 38a, the side surface of the upper guide portion 38b, and the side surface of the intermediate guide portion 38c that are arranged on the substantially same plane come into contact with and slide on the surface of the left guide rib 212.

In one or more embodiments, the battery pack 2 includes the grip 10 extending in the left-right direction for the user to grip.

According to the above configuration, when the battery pack 2 is to be attached to the battery pack mount 101 having the first right guide rib 110, the first left guide rib 114, the second right guide rib 112, and the second left guide rib 116 while the user is gripping the grip 10, the battery pack 2 can be suppressed from entering the state of being tilted in the front-rear direction.

As described above, in one or more embodiments, the battery pack 2 includes the casing 12, the battery-side terminals accommodated in the casing 12, and the terminal cover 28 configured to be attached to and detached from the casing 12. The casing 12 includes the bottom surface 4f of the body 4 (example of first casing surface) and the bottom surfaces 22a of the terminal receptacles 22 (examples of first depressed surface) that is depressed inward of the bottom surface 4f. Each of the bottom surfaces 22a includes the terminal opening 22e through which its corresponding terminal to be connected to one of the battery-side terminals is to be inserted. The terminal cover 28 includes the lower plate 28a (example of the first cover part) that covers the bottom surface 22a. When the terminal cover 28 is viewed from the front or rear side (example of the first direction along first casing surface) with the terminal cover 28 attached to the casing 12, an outer surface of the lower plate 28a is positioned inward of the bottom surface 4f. When the terminal cover 28 is viewed from the right or left side (example of the second direction that is along the first casing surface and perpendicular to the first direction) with the terminal cover 28 attached to the casing 12, the outer surface of the lower plate 28a is positioned inward of the bottom surface 4f.

In the battery pack 2 as above, when viewed along the front or rear direction with the terminal cover 28 attached to the casing 12, the lower plate 28a does not protrude outside beyond the casing 12, and also when viewed along the right or left direction, the lower plate 28a does not protrude outside beyond the casing 12. Due to this, an outer shape of the battery pack 2 is suppressed from increasing in size when the terminal cover 28 is attached to the casing 12.

In one or more embodiments, the outer surface of the lower plate 28a includes the finger receiving protrusion 28e (example of the first finger receiving portion) for the user to place a finger upon detaching the terminal cover 28 from the casing 12.

According to the above configuration, the user can more easily attach and detach the terminal cover 28.

In one or more embodiments, when viewed from the front or rear side with the terminal cover 28 attached to the casing 12, the distal end of the finger receiving protrusion 28e is positioned inward of the bottom surface 4f. When viewed from the right or left side with the terminal cover 28 attached to the casing 12, the distal end of the finger receiving protrusion 28e is positioned inward of the bottom surface 4f.

According to the above configuration, when viewed from the front or rear side with the terminal cover 28 attached to the casing 12, the finger receiving protrusion 28e does not protrude outside beyond the casing 12, and also when viewed from the right or left side, the finger receiving protrusion 28e does not protrude outside beyond the casing 12. Due to this, the outer shape of the battery pack 2 is suppressed from increasing in size when the terminal cover 28 is attached to the casing 12.

In one or more embodiments, the casing 12 includes the hook engaging groove 30 (example of the second finger receiving portion) for the user to place a finger upon detaching the terminal cover 28 from the casing 12.

According to the above configuration, the user can more easily attach and detach the terminal cover 28.

In one or more embodiments, the terminal cover 28 is configured to be attached to the casing 12 by being slid rearward, and to be detached from the casing 12 by being slid frontward.

According to the above configuration, the user can attach and detach the terminal cover 28 to and from the casing 12 by sliding the terminal cover 28. The user can attach and detach the terminal cover 28 without performing a complicated operation.

In one or more embodiments, the casing 12 further includes: the front surface 4a of the body 4 (example of the second casing surface) inclined with respect to the bottom surface 4f; and the front surfaces 22h of the terminal receptacles 22 (examples of the second depressed surface) depressed inward of the front surface 4a. The terminal cover 28 further includes the front plate 28b (example of the second cover part) that covers the front surfaces 22h. When viewed from the upper or lower side (example of the third direction along the second casing surface) with the terminal cover 28 attached to the casing 12, an outer surface of the front plate 28h is positioned inward of the front surface 4a. When viewed from the right or left side (example of the fourth direction along the second casing surface and perpendicular to the third direction) with the terminal cover 28 attached to the casing 12, the outer surface of the front plate 28h is positioned inward of the front surface 4a.

According to the above configuration, when viewed from the upper or lower side with the terminal cover 28 attached to the casing 12, the front plate 28b does not protrude outside beyond the casing 12, and also when viewed from the right or left side, the front plate 28h does not protrude outside beyond the casing 12. Due to this, the outer shape of the battery pack 2 is suppressed from increasing in size when the terminal cover 28 is attached to the casing 12.

In one or more embodiments, the casing 12 includes the right engaging part 24 and the left engaging part 26 (examples of the casing-side engaging part). The terminal cover 28 includes the right engaging protrusion 28k and the left engaging protrusion 28o (examples of the cover-side engaging part) configured to engage with the right engaging part 24 and the left engaging part 26, respectively.

According to the above configuration, the terminal cover 28 can be fixed with the terminal cover 28 attached to the casing 12, thus the terminal cover 28 can be suppressed from unintentionally detaching from the casing 12.

In one or more embodiments, the right engaging protrusion 28k is arranged between the upper slit 28l and the lower slit 28m, and the left engaging protrusion 28o is arranged between the upper slit 28p and the lower slit 28q.

According to the above configuration, the right engaging protrusion 28k and the left engaging protrusion 28o can be facilitated to elastically deform. When the user is to attach or detach the terminal cover 28, the engagement of the right engaging protrusion 28k with the right engaging part 24 and the engagement of the left engaging protrusion 28o with the left engaging part 26 and release of the engagements thereof can more easily be performed.

In one or more embodiments, when the terminal cover 28 is attached to the casing 12, movement of the terminal cover 28 with respect to the casing 12 in the front-rear direction, the left-right direction, and the up-down direction is restricted.

According to the above configuration, the terminal cover 28 can be suppressed from wobbling with respect to the casing 12 when the terminal cover 28 is attached to the casing 12.

As described above, in one or more embodiments, the battery pack 2 is configured to be attached to the battery pack mount 202 having the hook 208 by moving it downward with respect to the battery pack mount 202 and to be detached from the battery pack mount 202 by moving it upward with respect to the battery pack mount 202. The battery pack 2 comprises the casing 12. The casing 12 includes: the hook engaging groove 30 with which the hook 208 is to be engaged, the hook engaging groove 30 being defined in the front surface 4a of the casing 12; the hook sliding groove 32 (example of the hook sliding portion) arranged on the front surface 4a of the casing 12 below the hook engaging groove 30, the hook sliding groove 32 including the right sliding surface 32a and the left sliding surface 32b (examples of the hook sliding surface) on which the hook 208 slides; and the front surfaces 22h of the terminal receptacles 22 (examples of the hook passing portion) arranged on the front surface 4a of the casing 12 below the hook sliding groove 32 and which the hook 208 passes. Over an entirety of the hook sliding groove 32 in the up-down direction, the width of the right sliding surface 32a and the left sliding surface 32b in the left-right direction is smaller than the width of the hook 208 in the left-right direction. The depth of the hook engaging groove 30 in the front-rear direction is greater than the depth of the right sliding surface 32a and the left sliding surface 32b in the front-rear direction. The depth of the front surfaces 22b of the terminal receptacles 22 in the front-rear direction is greater than the depth of the right sliding surface 32a and the left sliding surface 32b in the front-rear direction.

According to the above configuration, when the battery pack 2 is moved in the up-down direction with respect to the battery pack mount 202, the hook 208 of the battery pack mount 202 firstly passes the front surfaces 22b of the terminal receptacles 22, then passes the hook sliding groove 32, and thereafter engages with the hook engaging groove 30. At this occasion, since the depth of the front surfaces 22b of the terminal receptacles 22 in the front-rear direction is greater than the depth of the right sliding surface 32a and the left sliding surface 32b in the front-rear direction, the sliding resistance that the battery pack 2 receives from the hook 208 upon when the hook 208 passes the front surfaces 22b of the terminal receptacles 22 can be reduced. Further, according to the above configuration, since the width of the right sliding surface 32a and the left sliding surface 32b in the left-right direction is smaller than the width of the hook 208 in the left-right direction over the entirety of the hook sliding groove 32 in the up-down direction, areas by which the hook 208 contacts the right sliding surface 32a and the left sliding surface 32b can be reduced, and the sliding resistance that the battery pack 2 receives from the hook 208 upon when the hook 208 passes through the hook sliding groove 32 can be reduced. Moreover, according to the above configuration, since the hook 208 engages with the hook engaging groove 30 instead of a hook engaging protrusion, the sliding resistance that the battery pack 2 receives from the hook 208 upon when the hook 208 engages can be reduced.

In one or more embodiments, the depth of the front surfaces 22b of the terminal receptacles 22 in the front-rear direction is greater than the depth of the hook engaging groove 30 in the front-rear direction.

According to the above configuration, the sliding resistance that the battery pack 2 receives from the hook 208 upon when the hook 208 of the battery pack mount 202 passes the front surfaces 22h of the terminal receptacles 22 can further be reduced.

In one or more embodiments, over the entirety of the hook sliding groove 32 in the up-down direction, the right sliding surface 32a and the left sliding surface 32h are both depressed rearward of the front surface 4a of the casing 12.

According to the above configuration, the sliding resistance that the battery pack 2 receives from the hook 208 upon when the hook 208 of the battery pack mount 202 passes the hook sliding groove 32 can further be reduced.

In one or more embodiments, the right sliding surface 32a and the left sliding surface 32b are separated apart from each other. The hook sliding groove 32 further includes the center surface 32c arranged between the right sliding surface 32a and the left sliding surface 32b and further depressed rearward of each of the right sliding surface 32a and the left sliding surface 32b.

According to the above configuration, when the hook 208 of the battery pack mount 202 passes the hook sliding groove 32, the hook 208 comes into contact with both the right sliding surface 32a and the left sliding surface 32b. Thus, the hook 208 can be suppressed form tilting in the left-right direction.

In one or more embodiments, the right sliding surface 32a and the left sliding surface 32b extend along the up-down direction.

If the right sliding surface 32a and the left sliding surface 32h are inclined from their lower sides toward their upper sides such that they are inclined rearward from the front side, the sliding resistance that the battery pack 2 receives from the hook 208 can be reduced, however, the internal space of the casing 12 would be reduced. On the other hand, if the right sliding surface 32a and the left sliding surface 32h are inclined from their lower sides toward their upper sides such that they are inclined frontward from the rear side, a large internal space of the casing 12 can be secured, however, the sliding resistance that the battery pack 2 receives from the hook 208 increases. According to the above configuration, since the right sliding surface 32a and the left sliding surface 32b extend along the up-down direction, the sliding resistance that the battery pack 2 receives from the hook 208 can be reduced while a large internal space of the casing 12 is secured.

In one or more embodiments, in the up-down direction, the hook engaging groove 30 is arranged at the center area of the front surface 4a of the casing 12.

According to the above configuration, as compared to a case in which the hook engaging groove 30 is arranged close to the upper end of the front surface 4a of the casing 12, an area in which the hook 208 slides against the casing 12 can be reduced.

What is claimed is:

1. A battery pack configured to be attached to a battery pack mount by moving the battery pack downward with respect to the battery pack mount and to be detached from the battery pack mount by moving the battery pack upward with respect to the battery pack mount,
the battery pack comprising a casing,
wherein
the casing includes a first guide groove and a second guide groove on a side surface of the casing in a left-right direction, the first guide groove extending upward from a lower end of the side surface and the second guide groove extending upward from the lower end of the side surface,
a length of the first guide groove in an up-down direction and a length of the second guide groove in the up-down direction are different,
the first guide groove includes:
a lower guide portion extending upward from the lower end of the side surface;
an upper guide portion above the lower guide portion and extending along the up-down direction; and
an intermediate guide portion connecting the lower guide portion and the upper guide portion, and
a width of the upper guide portion in a front-rear direction is smaller than a width of the lower guide portion in the front-rear direction and/or a depth of the upper guide portion in the left-right direction is smaller than a depth of the lower guide portion in the left-right direction.

2. The battery pack according to claim 1, wherein the length of the second guide groove in the up-down direction is smaller than half the length of the first guide groove in the up-down direction.

3. The battery pack according to claim 1, wherein
in the front-rear direction, the first guide groove is between one end of the side surface and a center of the side surface, and
in the front-rear direction, the second guide groove is between another end of the side surface and the center of the side surface.

4. The battery pack according to claim 1, wherein a width of the first guide groove in the front-rear direction and a width of the second guide groove in the front-rear direction are different at the lower end of the side surface.

5. The battery pack according to claim 4, wherein the width of the second guide groove in the front-rear direction is smaller than half the width of the first guide groove in the front-rear direction at the lower end of the side surface.

6. The battery pack according to claim 4, wherein
the length of the second guide groove in the up-down direction is smaller than the length of the first guide groove in the up-down direction, and
at the lower end of the side surface, the width of the second guide groove in the front-rear direction is smaller than the width of the first guide groove in the front-rear direction.

7. The battery pack according to claim 1, wherein, on one side in the front-rear direction, a side surface of the lower guide portion, a side surface of the upper guide portion, and a side surface of the intermediate guide portion are on a substantially same plane.

8. The battery pack according to claim 1, further comprising a grip extending in the left-right direction for a user to grip.

9. A battery pack configured to be attached to a battery pack mount by moving the battery pack downward with respect to the battery pack mount and to be detached from the battery pack mount by moving the battery pack upward with respect to the battery pack mount,
the battery pack comprising a casing,
wherein
the casing includes a first guide groove and a second guide groove on a side surface of the casing in a left-right direction, the first guide groove extending upward from a lower end of the side surface and the second guide groove extending upward from the lower end of the side surface, a length of the first guide groove in an up-down direction and a length of the second guide groove in the up-down direction are different, the length of the second guide groove in the up-down direction is smaller than half the length of the first guide groove in the up-down direction, in a front-rear direction, the first guide groove is between one end of the side surface and a center of the side surface, in the front-rear direction, the second guide groove is between another end of the side surface and the center of the side surface, a width of the first guide groove in the front-rear direction and a width of the second guide groove in the front-rear direction are different at the lower end of the side surface, the width of the second guide groove in the front-rear direction is smaller than half the width of the first guide groove in the front-rear direction at the lower end of the side surface, the first guide groove includes:
a lower guide portion extending upward from the lower end of the side surface;
an upper guide portion above the lower guide portion and extending along the up-down direction; and
an intermediate guide portion connecting the lower guide portion and the upper guide portion to each other,
a width of the upper guide portion in the front-rear direction is smaller than a width of the lower guide portion in the front-rear direction,
a depth of the upper guide portion in the left-right direction is smaller than a depth of the lower guide portion in the left-right direction,
on one side in the front-rear direction, a side surface of the lower guide portion, a side surface of the upper guide portion, and a side surface of the intermediate guide portion are on a substantially same plane, and
the battery pack further comprises a grip extending in the left-right direction for a user to grip.

\* \* \* \* \*